US012391457B2

(12) United States Patent
Welder

(10) Patent No.: US 12,391,457 B2
(45) Date of Patent: Aug. 19, 2025

(54) OXYGEN-ACTIVATED HEAT RELEASING ENCLOSURE

(71) Applicant: Southernmost Escape, LLC, Appling, GA (US)

(72) Inventor: Matthew D. Welder, Appling, GA (US)

(73) Assignee: SOUTHERNMOST ESCAPE, LLC, Appling, GA (US)

( * ) Notice: Subject to any disclaimer, the term of this patent is extended or adjusted under 35 U.S.C. 154(b) by 970 days.

(21) Appl. No.: 17/451,142

(22) Filed: Oct. 15, 2021

(65) Prior Publication Data

US 2022/0119185 A1 Apr. 21, 2022

Related U.S. Application Data

(60) Provisional application No. 63/094,713, filed on Oct. 21, 2020.

(51) Int. Cl.
*B65D 81/34* (2006.01)
*F28D 20/00* (2006.01)
*G08B 21/18* (2006.01)

(52) U.S. Cl.
CPC ....... *B65D 81/3484* (2013.01); *F28D 20/003* (2013.01); *G08B 21/182* (2013.01)

(58) Field of Classification Search
CPC ........ G08B 21/02; G08B 21/182; G08B 5/38; A61J 1/10; A61J 1/16; A61J 1/2027;

(Continued)

(56) References Cited

U.S. PATENT DOCUMENTS 4,709,135 A 11/1987 Dietrich et al.
4,735,609 A 4/1988 Comeau et al.
(Continued)

FOREIGN PATENT DOCUMENTS

WO 00/16722 A1 3/2000

OTHER PUBLICATIONS

Adams; et al., "Design of a Blood-Warming Device for Resource-Limited Settings", European Journal of Scientific Research (2013), 103(1):7-15.

(Continued)

*Primary Examiner* — Hung D Nguyen
(74) *Attorney, Agent, or Firm* — Ascenda Law Group, PC

(57) ABSTRACT

An oxygen-activated heat releasing enclosure includes an insulated shell with at least a first cutout portion, a second cutout portion, and a sealable opening that opens to a cavity of the oxygen-activated heat releasing enclosure. A transparent window, disposed within the first cutout portion, allows contents within the cavity to be visible from outside of the cavity. A heat releasing member, disposed within the second cutout portion, includes a powder chamber containing an oxygen-activated heat releasing powder. The powder chamber is formed by (i) an oxygen permeable membrane that allows oxygen to pass through the oxygen permeable membrane into the powder chamber and (ii) a thermally conductive membrane disposed between the oxygen permeable membrane and the transparent window. The oxygen-activated heat releasing enclosure also includes a sealing strip for sealing the sealable opening.

11 Claims, 22 Drawing Sheets

(58) Field of Classification Search
CPC .... A61J 2200/42; F28D 20/003; F28D 20/02; F24V 30/00; B65D 81/3484; A61M 1/16; A61M 1/1668; A61M 1/1672; A61M 1/169; Y02E 60/14

See application file for complete search history.

(56) References Cited

U.S. PATENT DOCUMENTS

| | | | |
|---|---|---|---|
| 4,934,336 | A | 6/1990 | White |
| 5,042,455 | A | 8/1991 | Yue et al. |
| 5,125,069 | A | 6/1992 | O'Boyle |
| 5,295,964 | A | 3/1994 | Gauthier |
| 5,408,576 | A | 4/1995 | Bishop |
| 5,875,282 | A | 2/1999 | Jordan et al. |
| 6,572,641 | B2 | 6/2003 | Brugger et al. |
| H2093 | H | 1/2004 | Warner et al. |
| 7,094,219 | B2 | 8/2006 | Noice et al. |
| 2008/0255538 | A1 | 10/2008 | Ellis |
| 2022/0227564 | A1* | 7/2022 | Pedicini ............ B65D 81/3484 |

OTHER PUBLICATIONS

"Blood transfusion", A manual for doctors, nurses and laboratory technicians, 2010 Edition, Medecins Sans Frontieres—Jun. 2010, 146 pgs.
"IV Fluid Warmer with Soft Sack, 3 Liter, Manufacturer: SmithWorks Medical Inc.", Bound Tree, retrieved Oct. 7, 2020 from: https://www.boundtree.com/IV-Drug-Delivery/IV-Warmers/IV-Fluid-Warmer-with-Soft-Sack-3-Liter/p/12VSS3L02, 6 pgs.
John; et al., "Peri-operative warming devices: performance and clinical application", Anaesthesia (2014), 69:623-638.
Lee; et al., "Performance characteristics of Ultratherm fluid warmer", Medicine, Anesthesia and analgesia (1993), abstract only.
Platts-Mills; et al., "An Experimental Study of Warming Intravenous Fluid in a Cold Environment", Wilderness & Environmental Medicine (Sep. 2007), 18(3):177-185.
Raleigh; et al., "Air-Activated Chemical Warming Devices: Effects of Oxygen and Pressure", Undersea Hyperb Med. Nov.-Dec. 2005;32(6):445-9.
Smith; et al., "Principles of Fluid and Blood Warming in Trauma", International TraumaCare (ITACCS) (2008), 18(1):71-79.

* cited by examiner (alternative embodiment)

OXYGEN-ACTIVATED HEAT RELEASING ENCLOSURE

RELATED APPLICATIONS

This application is a non-provisional patent application of and claims priority to U.S. Provisional Application No. 63/094,713, filed 21 Oct. 2020, incorporated herein by reference.

FIELD OF THE INVENTION

The present invention relates to an oxygen-activated heat releasing enclosure, and more particularly relates to an oxygen-activated heat releasing enclosure for heating a fluid container, such as a blood bag.

BACKGROUND

When delivering fluids to a person intravenously, blood is often warmed from a storage temperature (e.g., 1-6° C.) to body temperature (e.g., 36-38° C.) so as to prevent hypothermia, acidosis and/or coagulopathy from occurring in the recipient of the fluids. Existing blood warmers have one or more shortcomings. Some warmers are expensive (costing hundreds or thousands of dollars), are bulky and/or require an electrical outlet for operation. Other warmers may inadvertently contaminate the blood with heavy metals or other impurities. Described herein is a heat releasing enclosure that can be used to warm blood (or other fluids) while avoiding the above-mentioned deficiencies of currently available blood warmers.

SUMMARY OF THE INVENTION

In accordance with one embodiment of the invention, an oxygen-activated heat releasing enclosure may include an insulated shell with at least a first cutout portion, a second cutout portion, and a sealable opening that opens to a cavity of the oxygen-activated heat releasing enclosure. A transparent window, disposed within the first cutout portion, may allow contents within the cavity to be visible from outside of the cavity. A heat releasing member, disposed within the second cutout portion, may include a powder chamber containing an oxygen-activated heat releasing powder. The powder chamber may be formed by (i) an oxygen permeable membrane that allows oxygen to pass through the oxygen permeable membrane into the powder chamber and (ii) a thermally conductive membrane disposed between the oxygen permeable membrane and the transparent window. The oxygen-activated heat releasing enclosure may also include a sealing strip for sealing the sealable opening.

In accordance with one embodiment of the invention, a fluid heating system may include a heat releasing enclosure. The heat releasing enclosure may include an insulated shell comprising at least a first cutout portion, a second cutout portion, a first and second opening that lead to a cavity of the heat releasing enclosure. A transparent window may be disposed within the first cutout portion. A heat releasing member, disposed within the second cutout portion, may comprise a powder chamber containing an oxygen-activated heat releasing powder. The powder chamber may be formed by (i) an oxygen permeable membrane that allows oxygen to pass through the oxygen permeable membrane into the powder chamber and (ii) a thermally conductive membrane. The fluid heating system may also include a fluid receiving conduit that passes through the first opening, a fluid dispensing conduit that passes through the second opening, and a fluid container disposed within the cavity of the heat releasing enclosure. The fluid container may include an inlet that is fluidly connected to the fluid receiving conduit and an outlet that is fluidly connected to the fluid dispensing conduit.

These and other embodiments of the invention are more fully described in association with the drawings below.

BRIEF DESCRIPTION OF THE DRAWINGS

The invention is now described, by way of example and without limiting the scope of the invention, with reference to the accompanying drawings which illustrate embodiments of it, in which.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Figure 1A:
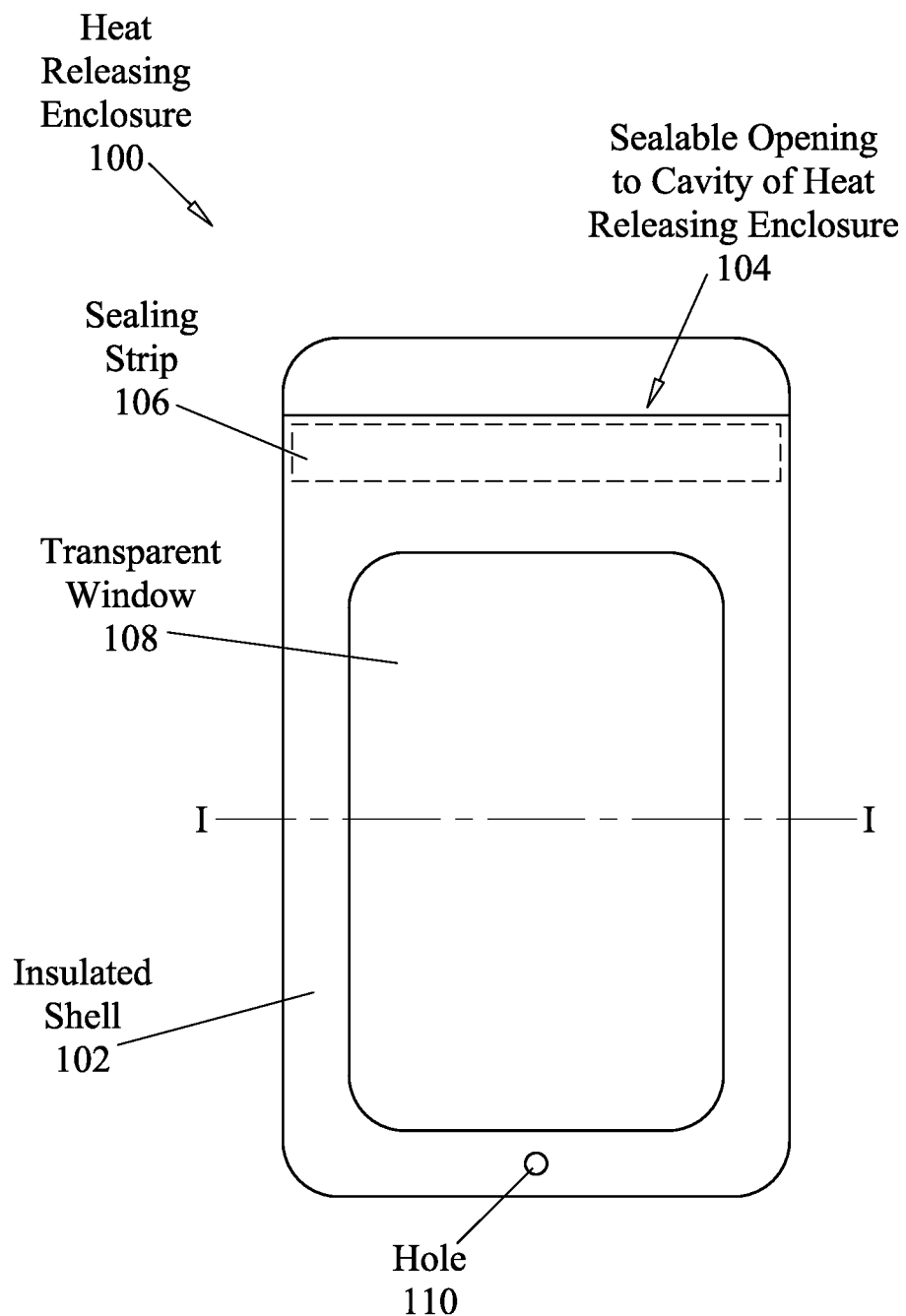
FIG. 1A depicts a front view of a heat releasing enclosure, in accordance with one embodiment of the invention.

FIG. 1A depicts a front view of heat releasing enclosure 100. Heat releasing enclosure 100 may include insulated shell 102, which may be constructed from a light weight material, such as foil that is padded with a layer of bubble wrap or other insulating material and/or coated with a heat reflecting film (e.g., polyimide). Insulated shell 102 (in combination with other components) may enclose cavity 202 (visible in the perspective cross-sectional view of FIG. 2A), which may be accessed through opening 104.

Sealing strip 106 may be used to seal opening 104 in a manner similar to how an envelope is sealed, in which two surfaces are pressed together to form a seal. The seal may be a permanent seal, such that once the two surfaces are pressed together, they may not be separated again without tearing one or more of the surfaces. Alternatively, the seal may be a temporary seal, such that once the two surfaces are pressed together, they may be pulled apart without destroying or deforming the two surfaces. A temporary seal may be formed using an adhesive, such as that used in painter's tape or a Post-it®. Alternatively, a temporary seal may be formed using a fastener, such as a Velcro® fastener, a Ziploc® press and seal fastener, a zipper, buttons, etc. If not already apparent, the use of dashed lines to illustrate sealing strip 106 indicates that the sealing strip may not be visible in the front view of heat releasing enclosure 100. Rather, sealing strip 106 may be located on an inner surface of insulated shell 102 (i.e., surface that faces cavity 202) that is adjacent to opening 104.

Heat releasing enclosure 100 may include transparent window 108, which allows the contents within cavity 202 to be visible from outside of cavity 202. Transparent window 108 may be formed using a clear plastic sheet. As should be apparent, transparent window 108 may be disposed within a cutout of insulated shell 102 with shape/dimensions substantially similar to those of transparent window 108. While transparent window 108 has been depicted so that almost the entirety of cavity 202 is visible from outside of the cavity, the size of transparent window 108 may be decreased for increased heat insulation. FIG. 2B depicts an alternative embodiment with reduced dimensions of transparent window 108.

Figure 4A:
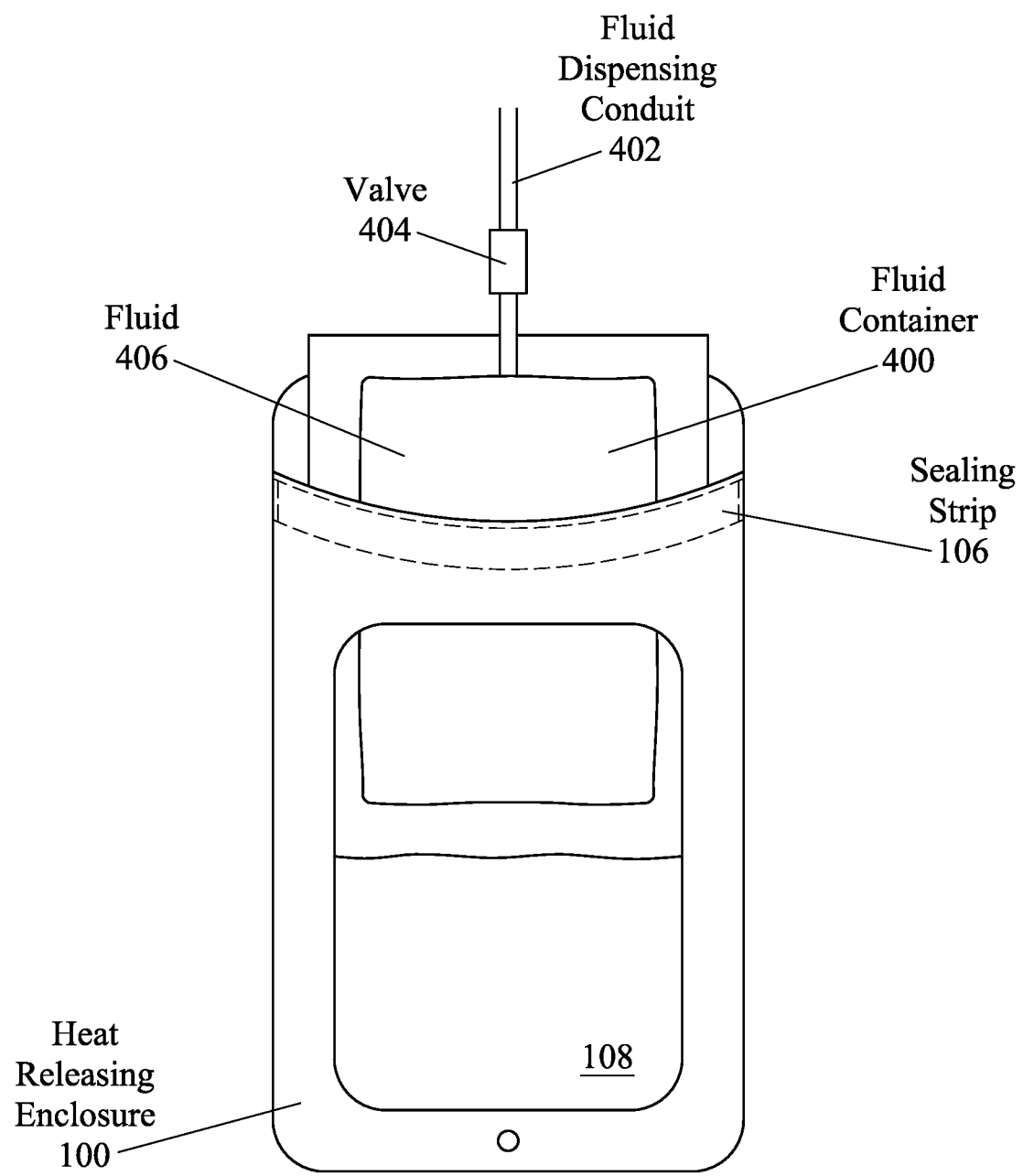
FIG. 4A depicts a front view of a heat releasing enclosure with a fluid container (e.g., a blood bag) being inserted into a cavity thereof, in accordance with one embodiment of the invention.

Insulated shell 102 may also include hole 110 (or other component that allows heat releasing enclosure 100 to be mounted on a stand or wall) along a peripheral portion of insulated shell 102. Hole 110 may be used to hang heat releasing enclosure on a hook (or other hanging mechanism), as shown in FIG. 4D. Preferably, hole 110 does not penetrate into cavity 202 so as to minimize heat loss from cavity 202.

Figure 1B:
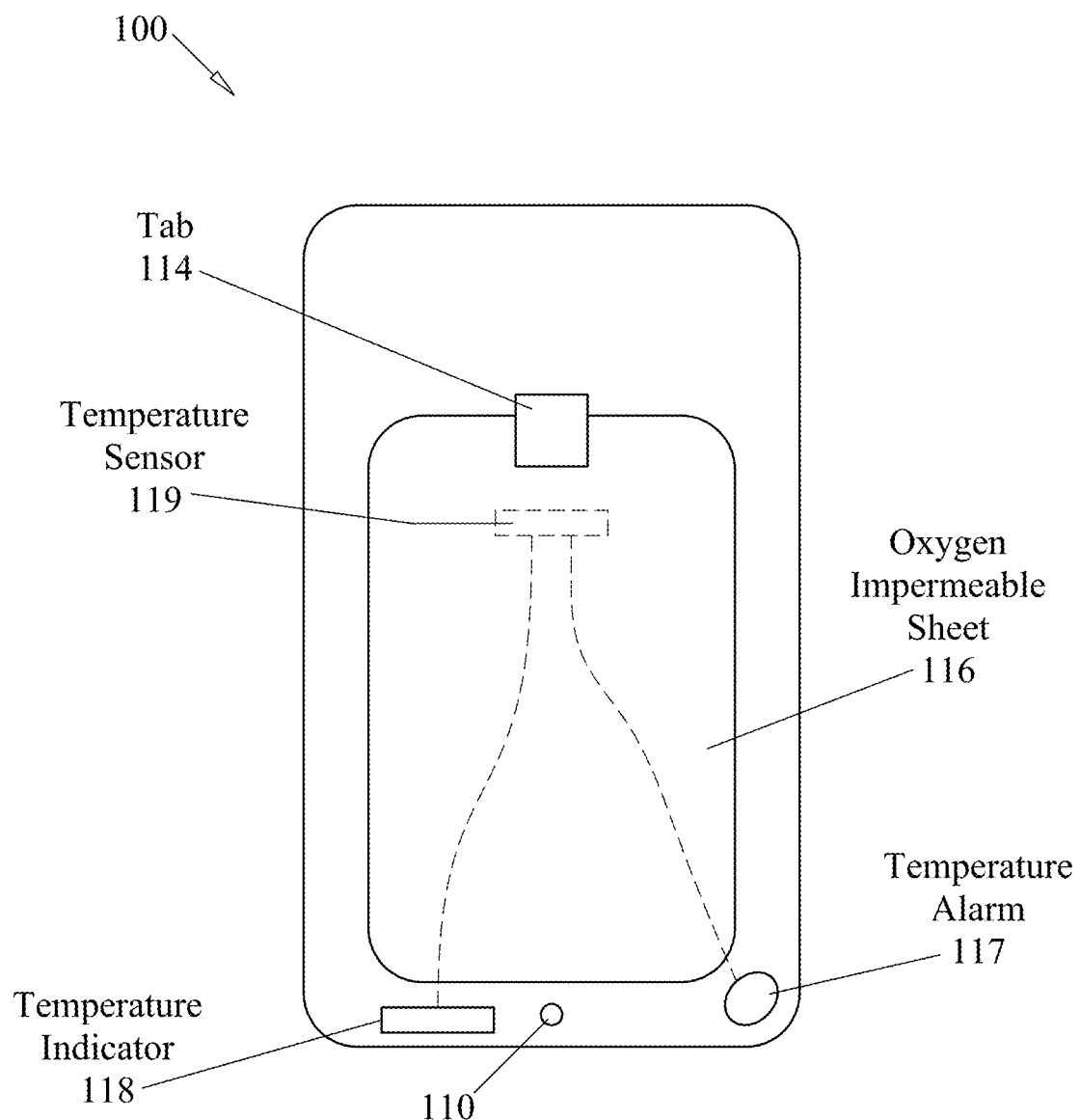
FIG. 1B depicts a back view of the heat releasing enclosure of FIG. 1A, in accordance with one embodiment of the invention.

FIG. 1B depicts a back view of heat releasing enclosure 100. Heat releasing enclosure 100 may include tab 114 (or "pull tab") for peeling oxygen impermeable sheet 116 away from heat releasing enclosure 100 (as later depicted in FIG. 1C). Oxygen impermeable sheet 116 is present prior to the "activation" of heat releasing enclosure 100, and prevents oxygen from activating a heat releasing powder within heat releasing enclosure 100. The process of activating heat releasing enclosure 100 will be discussed below in FIG. 1C.

Heat releasing enclosure 100 may include temperature indicator 118 (e.g., a digital temperature indicator) which may indicate a temperature measured by temperature sensor 119 that is disposed within cavity 202. If not already apparent, the use of dashed line indicates that temperature sensor 119 and the wires that communicatively couple temperature sensor 119 to temperature indicator 118 and/or temperature alarm 117 may not be visible in the back view of heat releasing enclosure 100. Typically, when in use, temperature sensor 119 contacts a fluid container within cavity 202, so temperature sensor 119 approximately measures the temperature of the fluid contained within the fluid container. However, as the temperature of the fluid container may not be exactly equal to the temperature of the fluid within the fluid container (e.g., due to insulative properties of the fluid container), temperature indicator 118 may only indicate an approximate temperature (rather than an exact temperature) of the fluid within the fluid container. While not depicted, it is also possible for a color changing thermometer strip to perform the functions of both temperature indicator 118 and temperature sensor 119. Such a color changing thermometer strip may be located on a surface within cavity 202 that is visible through transparent window 108.

Temperature sensor 119 may also be communicatively coupled to temperature alarm 117 that transmits an alarm signal if the temperature measured by temperature sensor 119 deviates outside of a desired range (e.g., 95-105° F.). The alarm signal may be a visual alarm, such as for example the display of a particular color of light (e.g., red light), the display of light in a particular fashion (e.g., flashing light), etc. Alternatively, or in addition, the alarm signal may be transmitted using sound. If the temperature of heat releasing enclosure 100 exceeds the desired range, opening 104 may be unsealed so as to release heat from the cavity 202. If the temperature of heat releasing enclosure 100 falls below the desired range, additional heat sources (as will be later described) may be activated within heat releasing enclosure 100 to raise the temperature back within the desired range. If additional heat sources are not available, the temperature falling below the desired range may indicate that the useful lifetime of heat releasing enclosure 100 has been reached.

Figure 1C:
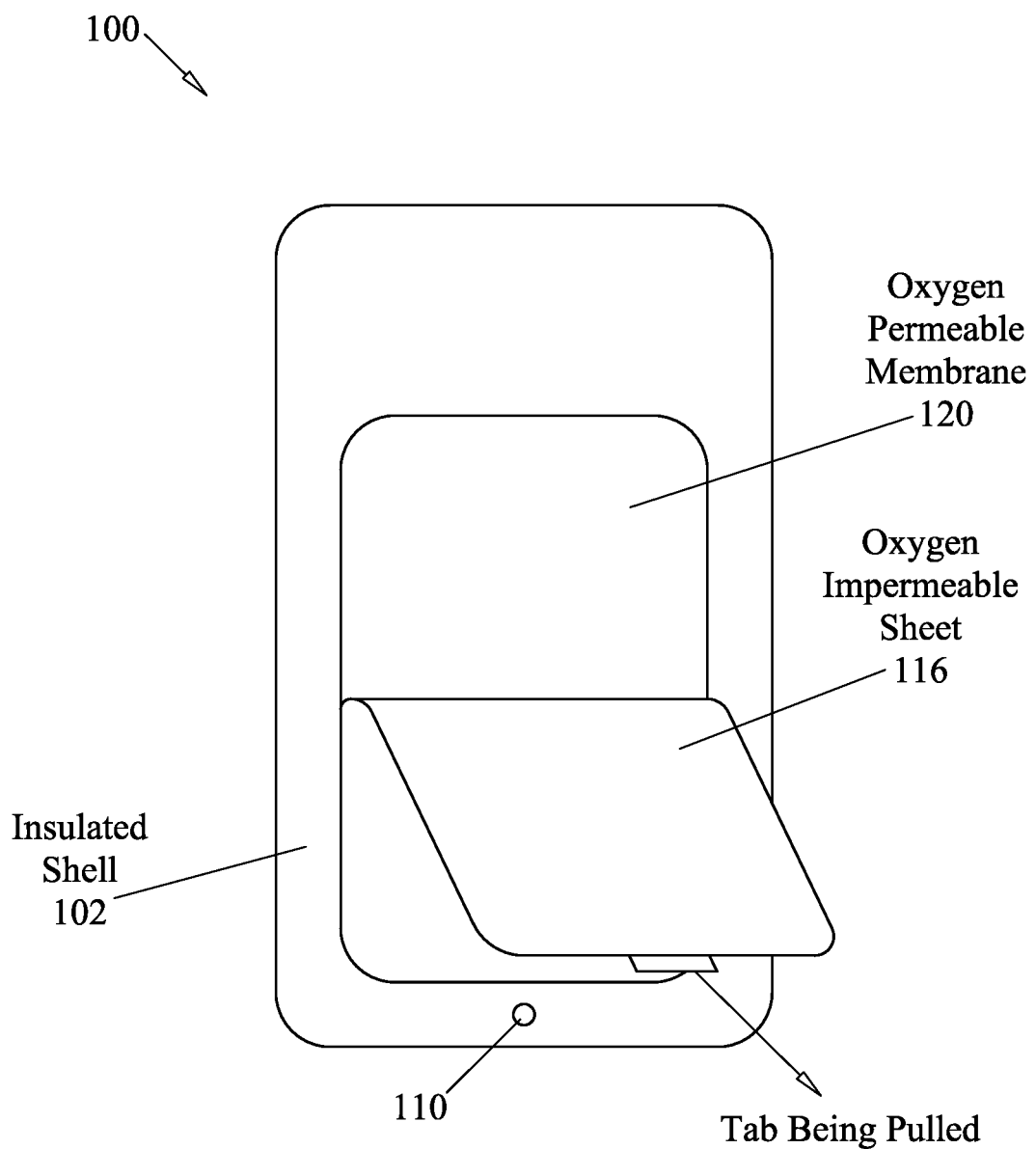
FIG. 1C depicts an oxygen impermeable sheet being peeled away from the heat releasing enclosure of FIG. 1A, in accordance with one embodiment of the invention.

FIG. 1C depicts a process of activating heat releasing enclosure 100 by peeling oxygen impermeable sheet 116 away from heat releasing enclosure 100. The removal of oxygen impermeable sheet 116 allows oxygen (and other constituents of air) to penetrate oxygen permeable membrane 120 (e.g., made of Tyvek® manufactured by DuPont de Nemours, Inc.™ of Wilmington, DE). The oxygen from air then exothermically reacts with a heat releasing powder within heat releasing enclosure 100, causing heat to be released within cavity 202. The location of the heat releasing powder is described in more detail in FIG. 2A. If not already apparent, oxygen permeable membrane 120 may be located within another cutout of insulated shell 102. The shape/dimensions of oxygen permeable membrane 120 may substantially match the shape/dimensions of the corresponding cutout of insulated shell 102.

Prior to the separation of oxygen impermeable sheet 116 from heat releasing enclosure 100, oxygen impermeable sheet 116 may be secured to insulated shell 102 and/or to oxygen permeable membrane 120 by a weakly bonding adhesive. As a result, oxygen impermeable sheet 116 may be peeled away from heat releasing enclosure 100 without tearing oxygen permeable membrane 120. The dimensions of oxygen impermeable sheet 116 may substantially equal (or be slightly larger) than the dimensions of oxygen permeable membrane 120 in order to prevent air from contacting any portion of oxygen permeable membrane 120. In another embodiment, it is also possible for oxygen impermeable sheet 116 to be formed by a portion of insulated shell 102 (i.e., this embodiment assumes that insulated shell 102 is oxygen impermeable) with perforations all along the perimeter of oxygen impermeable sheet 116. In such an embodiment, tab 114 may be used to tear off a portion of insulated shell 102 so as to expose oxygen permeable membrane 120.

Figure 2A:
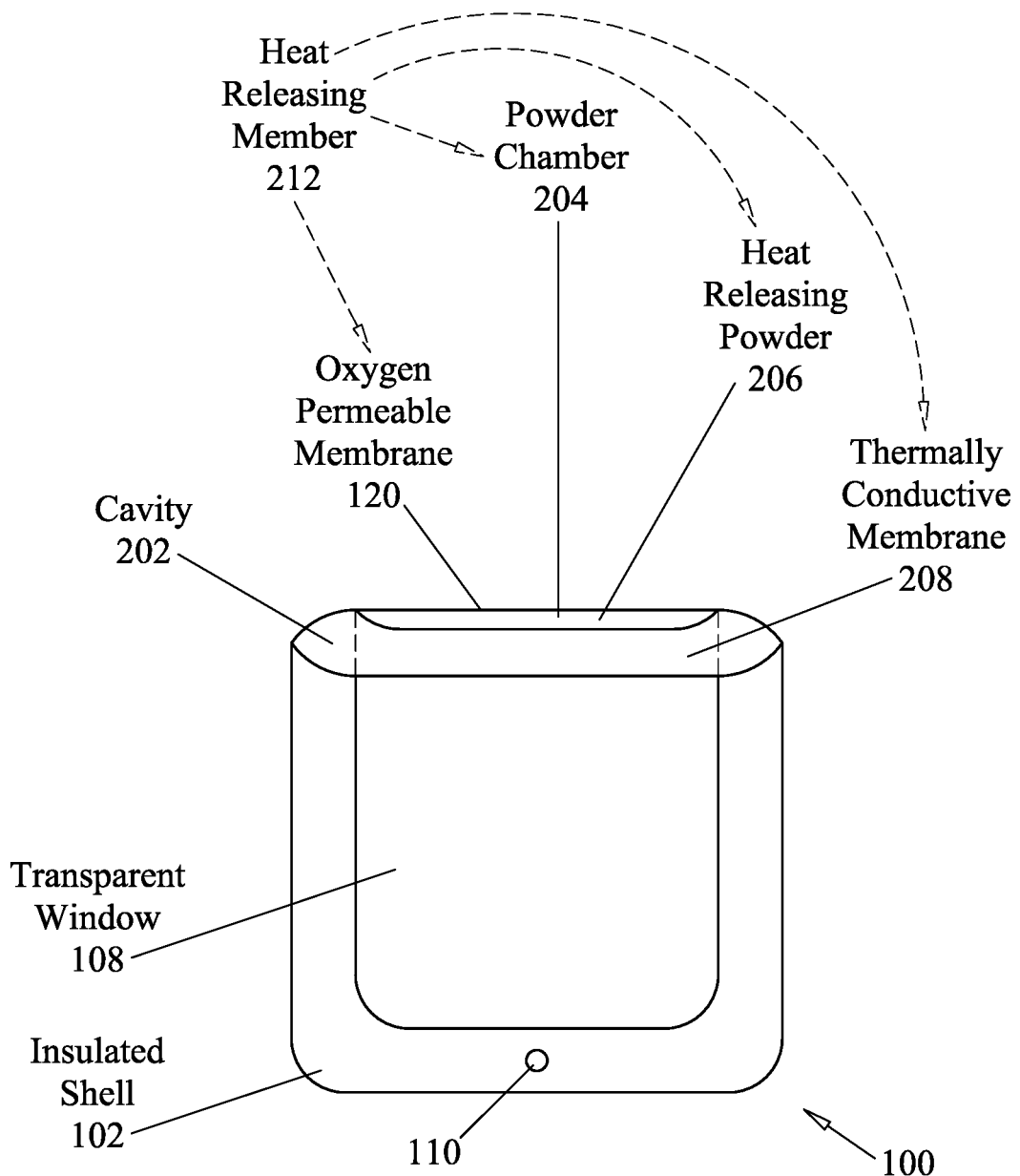
FIG. 2A depicts a perspective cross-sectional view of the heat releasing enclosure along line I-I of FIG. 1A, in accordance with one embodiment of the invention.
Figure 2B:
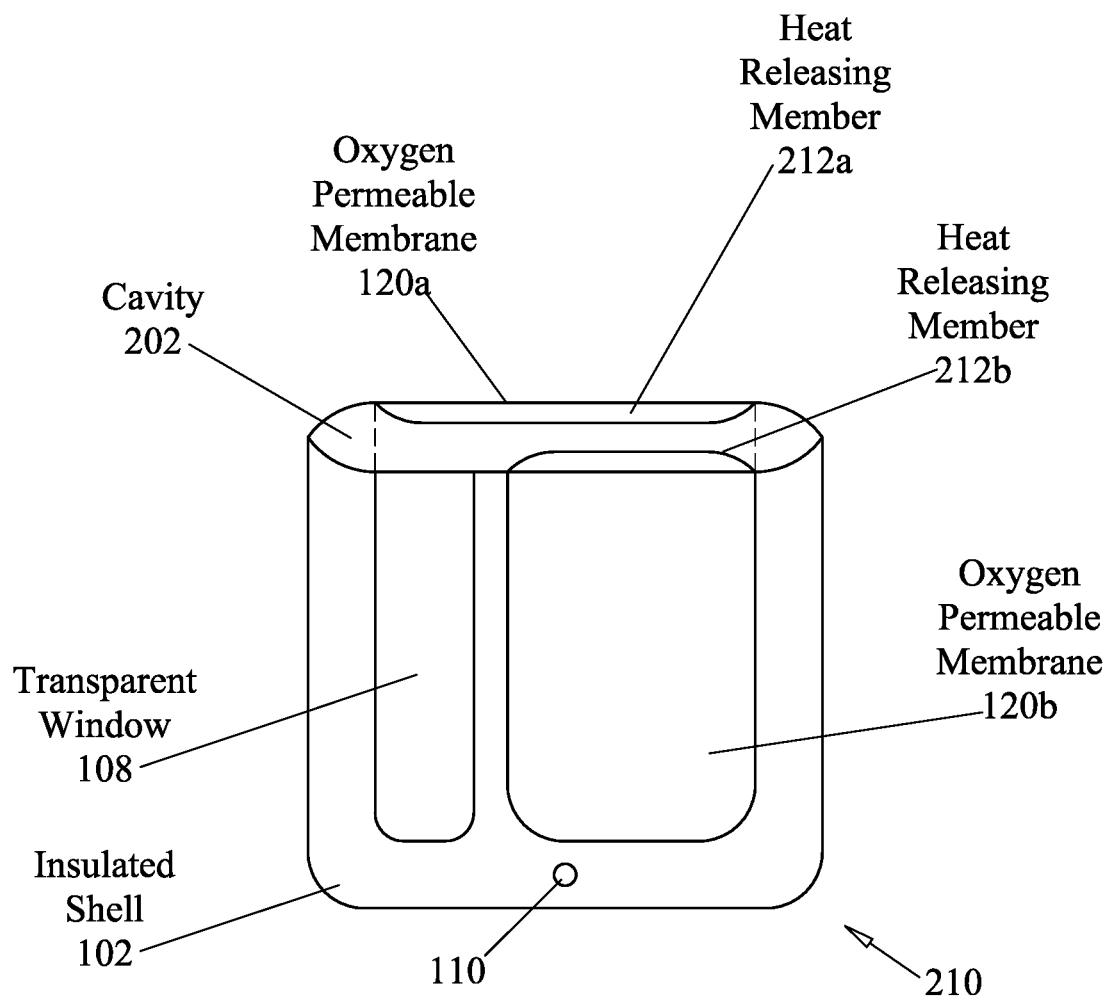
FIG. 2B depicts an alternative embodiment of the heat releasing enclosure, in which multiple heat releasing members are employed, in accordance with one embodiment of the invention.

FIG. 2A depicts a perspective cross-sectional view of heat releasing enclosure 100 along line I-I of FIG. 1A. Visible in the perspective cross-sectional view is cavity 202, which is formed by the combination of insulated shell 102, transparent window 108, and heat releasing member 212. As will be described in FIGS. 4A and 4B below, a fluid container (e.g., a blood bag) may be placed in cavity 202 when heat releasing enclosure 100 is in use.

Heat releasing member 212 includes powder chamber 204 which is formed in the space between oxygen permeable membrane 120 and thermally conductive membrane 208. Powder chamber 204 may contain a heat releasing powder 206 that includes a mixture of iron particles, salt, vermiculite and activated carbon (e.g., charcoal). When oxygen reacts with the iron particles, the iron particles are transformed into iron oxide, and at the same time, heat is released. Salt is used as a catalyst to speed up the reaction of iron with oxygen. In operation, heat is transferred to the fluid container primarily through the heat transfer mechanism of conduction, in which heat passes from thermally conductive membrane 208 directly to the fluid container, or from thermally conductive membrane 208 to air inside cavity 202 and from the air to the fluid container.

If not already apparent, thermally conductive membrane 208 may also be oxygen impermeable, so that oxygen inside cavity 202 does not penetrate thermally conductive membrane 208 and prematurely activate heat releasing powder 206. In some embodiments, it is possible that the temperature of heat releasing powder 206, once activated, exceeds that of the desired temperature range within cavity 202. In such cases, the thermal conductivity of thermally conductive membrane 208 may need to be chosen to have a lower value, so that the temperature within cavity 202 increases more gradually. In some embodiments, if heat releasing member 212 is "scalding hot", it may be necessary to place a piece of insulative material between heat releasing member 212 and the fluid container so as to prevent heat releasing member 212 from overheating portions of the fluid bag.

FIG. 2B depicts heat releasing enclosure 210, in which multiple heat releasing members are employed. In addition to heat releasing member 212a (which is similar to heat releasing member 212 of FIG. 2A), heat releasing enclosure 210 includes heat releasing member 212b. While not depicted in FIG. 2B, it is understood that prior to activation, an oxygen impermeable sheet (similar to that depicted in FIGS. 1B and 1C) may cover oxygen permeable membranes 120a and 120b to prevent the premature activation of heat releasing members 212a and 212b. During use, one or more of heat releasing members 212a and 212b may be activated at the same time or in a staggered manner (i.e., one after another). For instance, heat releasing member 212a may be activated first, and once the heat output from heat releasing member 212a starts to decrease, heat releasing member 212b may then be activated in order to sustain the heat output. Due to the presence of heat releasing member 212b, transparent window 108 of heat releasing enclosure 210 has reduced dimensions, as compared to transparent window 108 of heat releasing enclosure 100. While two heat releasing members are illustrated in FIG. 2B, it is understood that two or more two heat releasing members may be present in a single heat releasing enclosure.

Figure 3:
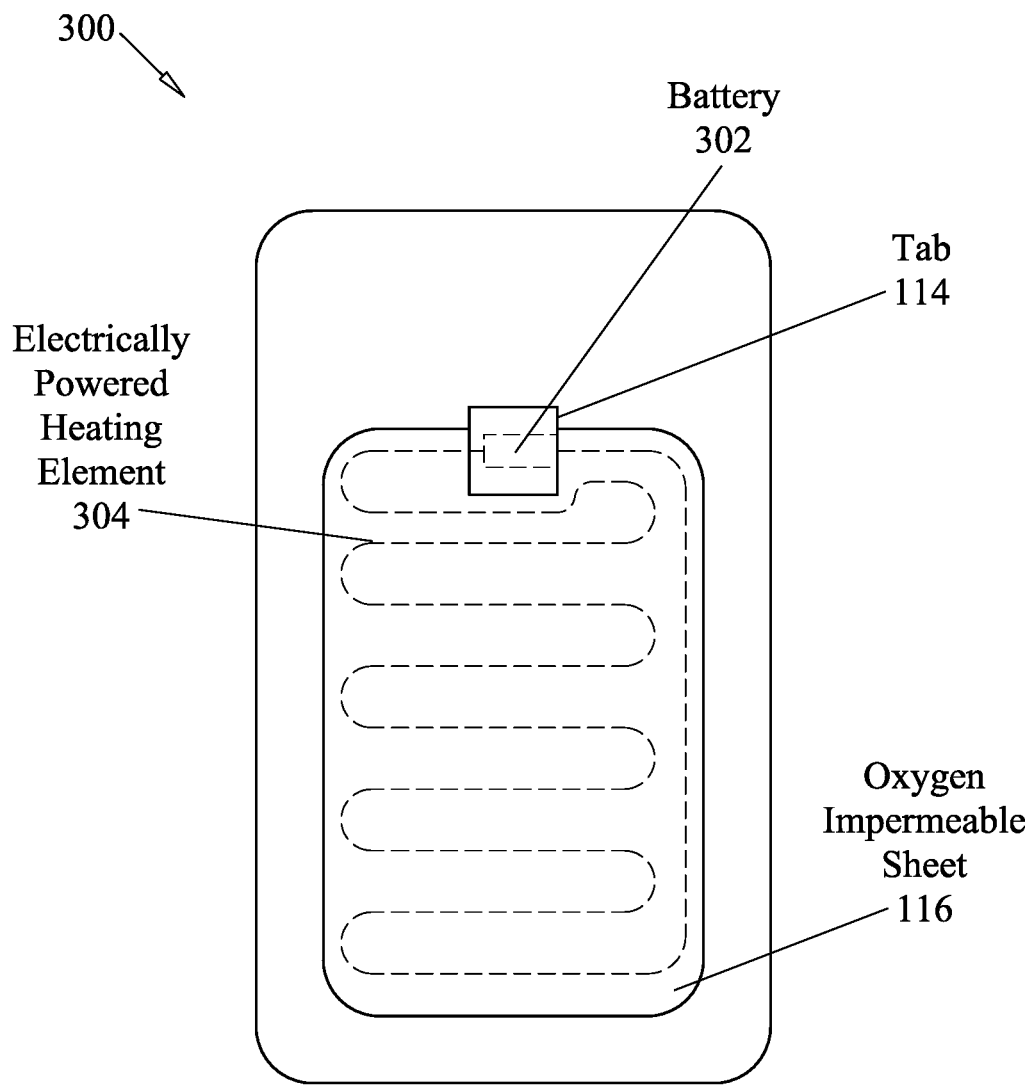
FIG. 3 depicts, in dashed line, an electrically powered heating element that is disposed within a heat releasing enclosure, in accordance with one embodiment of the invention.

FIG. 3 depicts an optional electrically powered heating element 304 of heat releasing enclosure 300 that may be included in addition to heat releasing member 212. Heating element 304 is depicted in dashed line because it is present within heat releasing enclosure 300 and may not be visible in either the front or back view of heat releasing enclosure 300. (It is understood that FIG. 3 corresponds to the back view of heat releasing enclosure 300; the front view of heat releasing enclosure 300 is substantially similar to that depicted in FIG. 1A, so it is not shown for conciseness.) In one embodiment, heating element 304 may be located adjacent to thermally conductive membrane 208. More specifically, heating element 304 may be located on the surface of thermally conductive membrane 208 facing cavity 202, or may be located on the surface of thermally conductive membrane 208 facing away from cavity 202. In the latter case, heating element 304 may be located within powder chamber 204. It is also possible for heating element 304 to be embedded within thermally conductive membrane 208 (very much like how a heating element is embedded within an electric blanket).

Battery 302 may be used to power heating element 304. To reduce the number of components (and hence the cost of heat releasing enclosure 100), the pulling of tab 114 may simultaneously activate heat releasing member 212 as well as electrically connect battery 302 to heating element 304. For instance, prior to activation, a nonconductive membrane may separate one of the contacts of battery 302 from heating element 304. In addition to peeling away oxygen impermeable sheet 116, the pulling of tab 114 may simultaneously pull away the nonconductive membrane causing heating element 304 to be powered by battery 302. While not depicted, it is also possible for an on/off switch to be used to turn on/off heating element 304. In one use case, heat releasing member 212 may initially be used to heat cavity 202. However, as the heat output from heat releasing member 212 starts to decrease, heating element 304 can be turned on so as to maintain the desired temperature within cavity 202.

FIGS. 4A-4D depict a step-by-step process that illustrates how heat releasing enclosure 100 may be used to warm fluid contained within a fluid container (e.g., blood bag, IV bag)

prior to the fluid being delivered to a patient. FIG. 4A depicts a front view of heat releasing enclosure 100 with fluid container 400 (e.g., an intravenous bag, a blood bag) being inserted through opening 104 into cavity 202 of heat releasing enclosure 100. Fluid 406 (e.g., water, normal saline, Ringer's lactate solution, red blood cells, plasma, albumin, volume expanders and fresh whole blood, etc.) may be contained within fluid container 400. Fluid container 400 may be fluidly connected to fluid dispensing conduit 402 with valve 404 for regulating the flow of fluid through fluid dispensing conduit 402. As shown in FIG. 4A, heat releasing enclosure 100 may be sized so that fluid container 400 fits snugly within cavity 202.

Figure 4B:
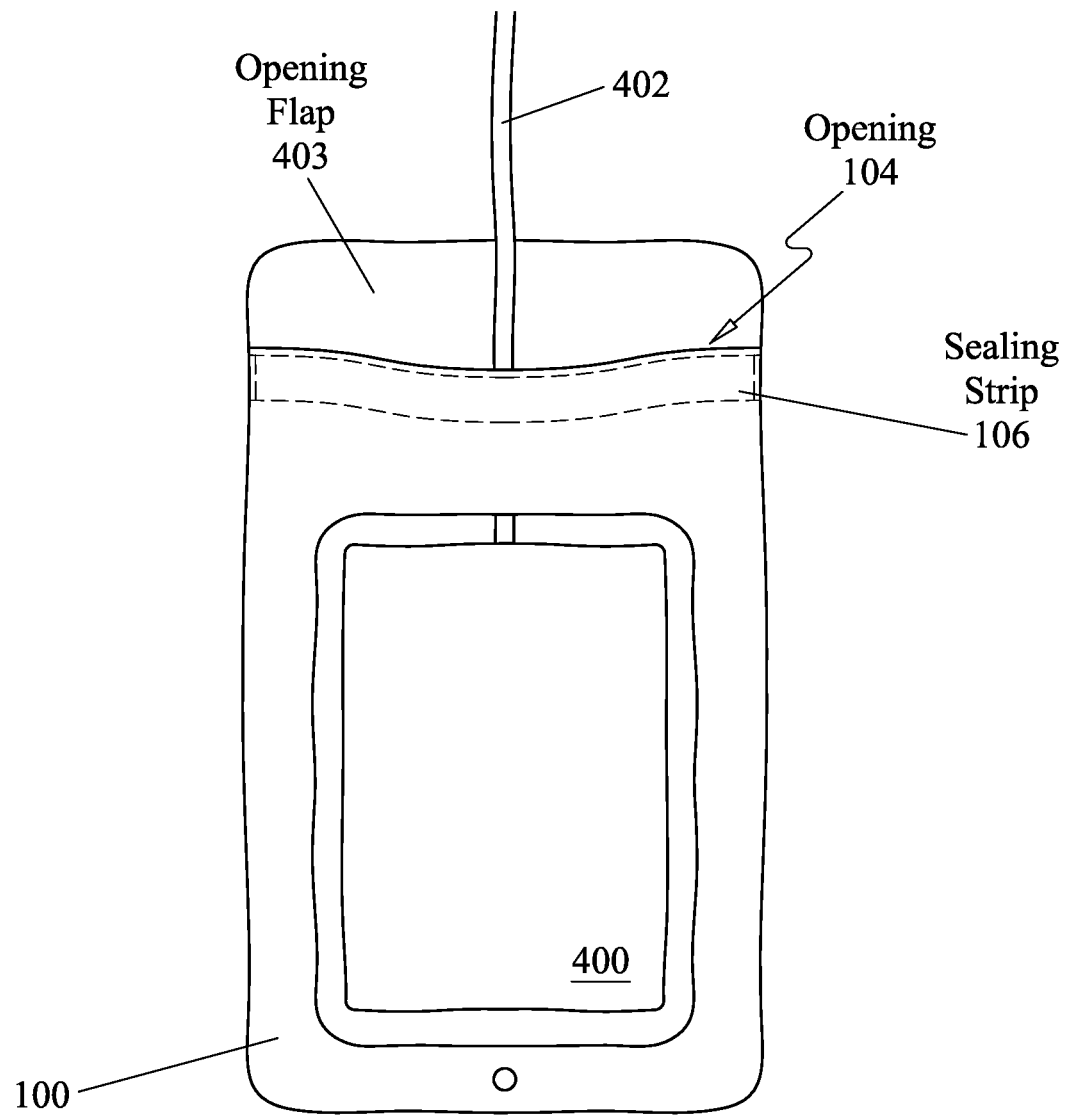
FIG. 4B depicts a front view of a heat releasing enclosure with a fluid container fully inserted therein, in accordance with one embodiment of the invention.

FIG. 4B depicts a front view of heat releasing enclosure 100 with fluid container 400 fully inserted therein. Once fluid container 400 has been fully inserted, sealing strip 106 may be used to seal cavity 202 (e.g., by pressing sealing strip 106 against opening flap 403 of heat releasing enclosure 100). The seal created by sealing strip 106 serves two purposes. First, it prevents heat loss from cavity 202 once heat releasing member 212 has been activated. Second, it prevents fluid container 400 from falling out from heat releasing enclosure 100 when heat releasing enclosure 100 is inverted and hung on a hanging mechanism (as will be described in FIG. 4D). While most of opening 104 is sealed by sealing strip 106, it is noted that a small portion of opening 104 remains unsealed so as to permit fluid dispensing conduit 402 to protrude out of opening 104.

Figure 4C:
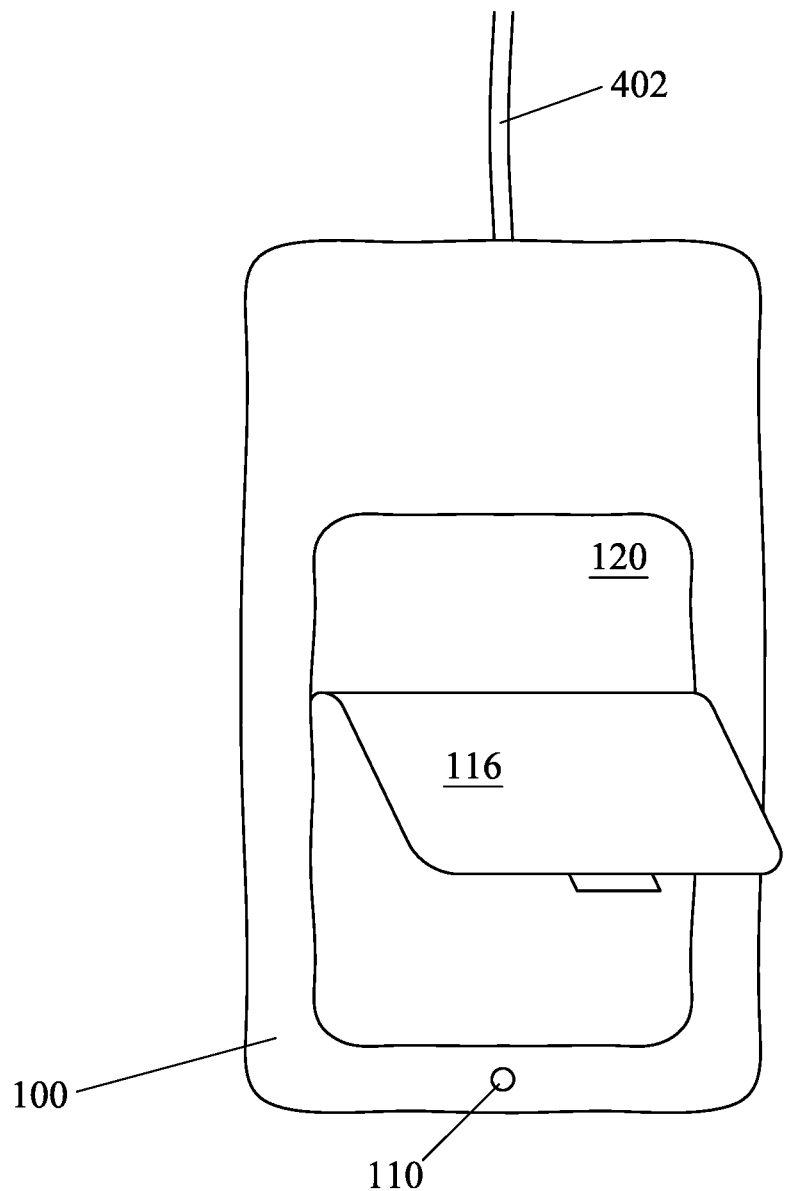
FIG. 4C depicts a back view of a heat releasing enclosure with a fluid container fully inserted therein, and further depicts an oxygen impermeable sheet being peeled away from the heat releasing enclosure, in accordance with one embodiment of the invention.
Figure 4D:
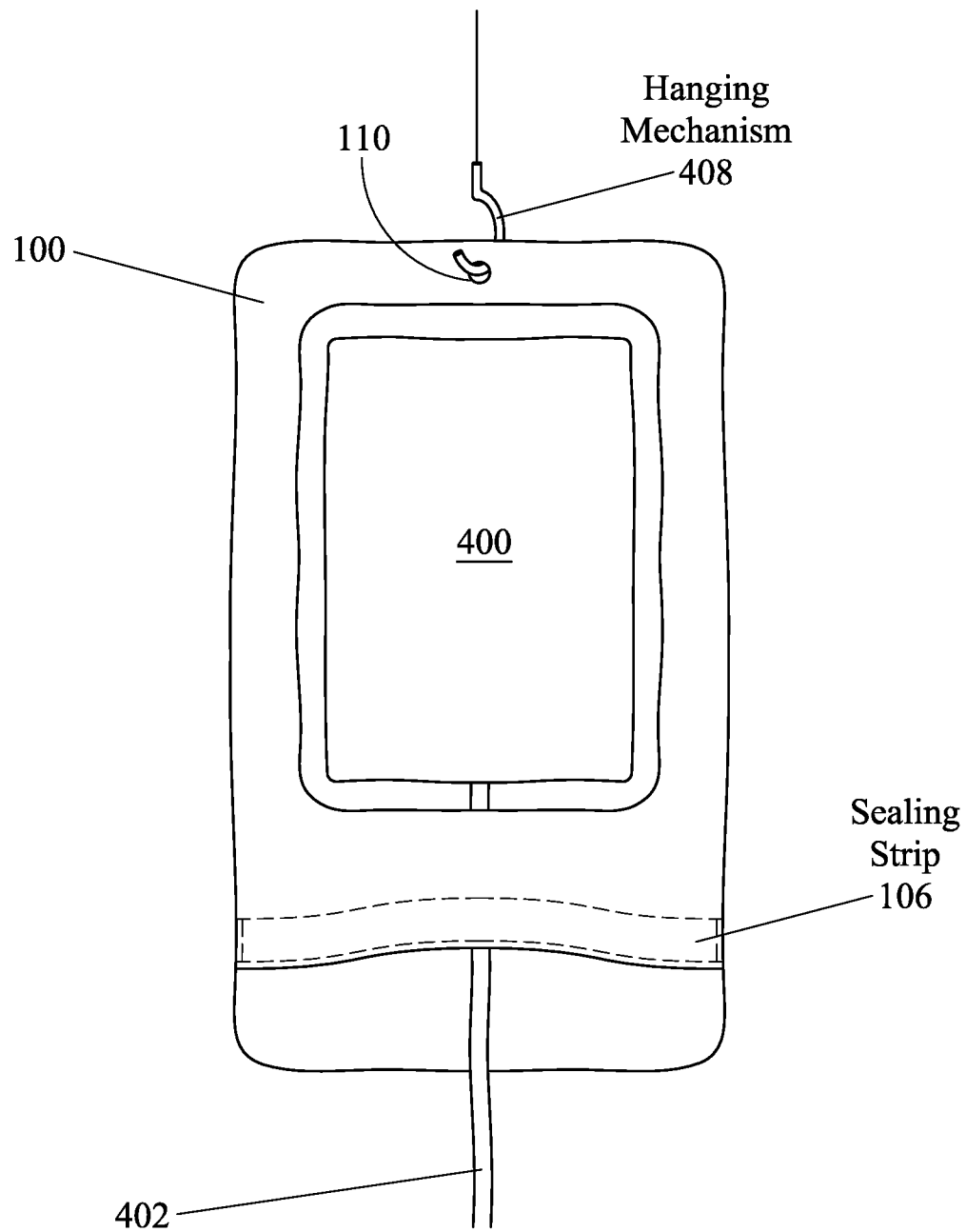
FIG. 4D depicts a front view of a heat releasing enclosure, in which the heat releasing enclosure (with the fluid container inserted therein) is mounted on a hanging mechanism, in accordance with one embodiment of the invention.

FIG. 4C depicts a back view of heat releasing enclosure 100 with fluid container 400 fully inserted therein, and further depicts oxygen impermeable sheet 116 being peeled away to expose oxygen permeable membrane 120 to air. Once oxygen impermeable sheet 116 is peeled away, the fluid that is housed in heat releasing enclosure 100 starts to warm. To speed up the exothermic oxidation process, the air surrounding heat releasing enclosure 100 may be fanned (e.g., with a fan or with a person's hand). Once the fluid within fluid container 400 has reached the desired temperature, the warmed fluid may be delivered to a patient. If desired, hole 110 may be used to hang heat releasing enclosure 100 on a hanging mechanism 408 (e.g., a hook), as depicted in FIG. 4D. It is noted that the precise sequence of steps may be varied. For instance, it is also possible to first activate the heat releasing enclosure (as shown FIG. 4C) before inserting fluid container 400 into heat releasing enclosure 100 (as shown in FIG. 4A).

Figure 4E:
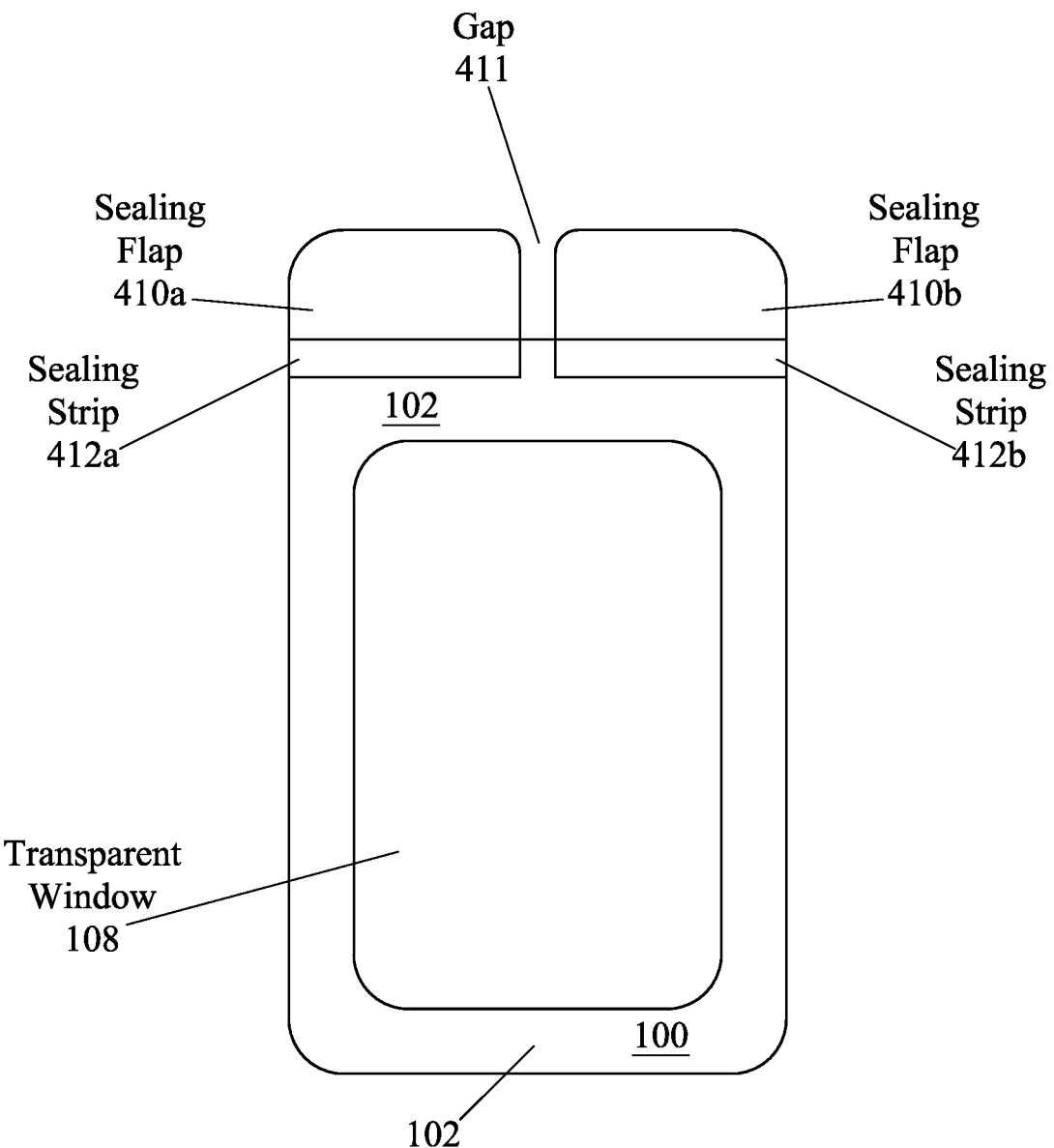
FIGS. 4E-4H illustrate an alternative method and mechanism for sealing the heat releasing enclosure, in accordance with one embodiment of the invention.

FIGS. 4E-4H depicts an alternative method and mechanism to seal heat releasing enclosure 100. FIG. 4E depicts a front view of heat releasing enclosure 100 with sealing flaps 410a and 410b which may be folded down and pressed against sealing strips 412a/b in order to seal cavity 202 of heat releasing enclosure 100. In contrast to sealing strip 106, sealing strips 412a/b may be located and be visible on the outer surface of insulated shell 102. Sealing flaps 410a/b may be spaced apart by gap 411 to allow for fluid dispensing conduit 402 to protrude from cavity 202 of heat releasing enclosure 100 (as will be more clearly shown in FIGS. 4G and 4H).

Figure 4F:
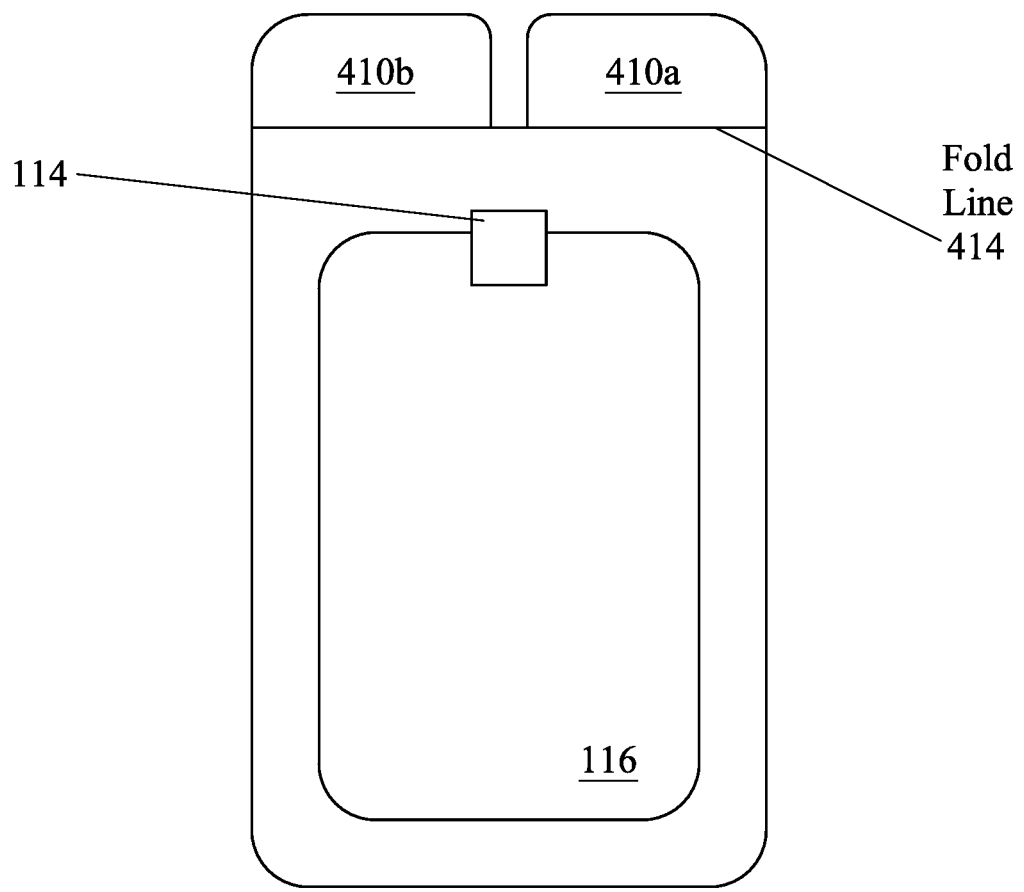
Figure 4G:
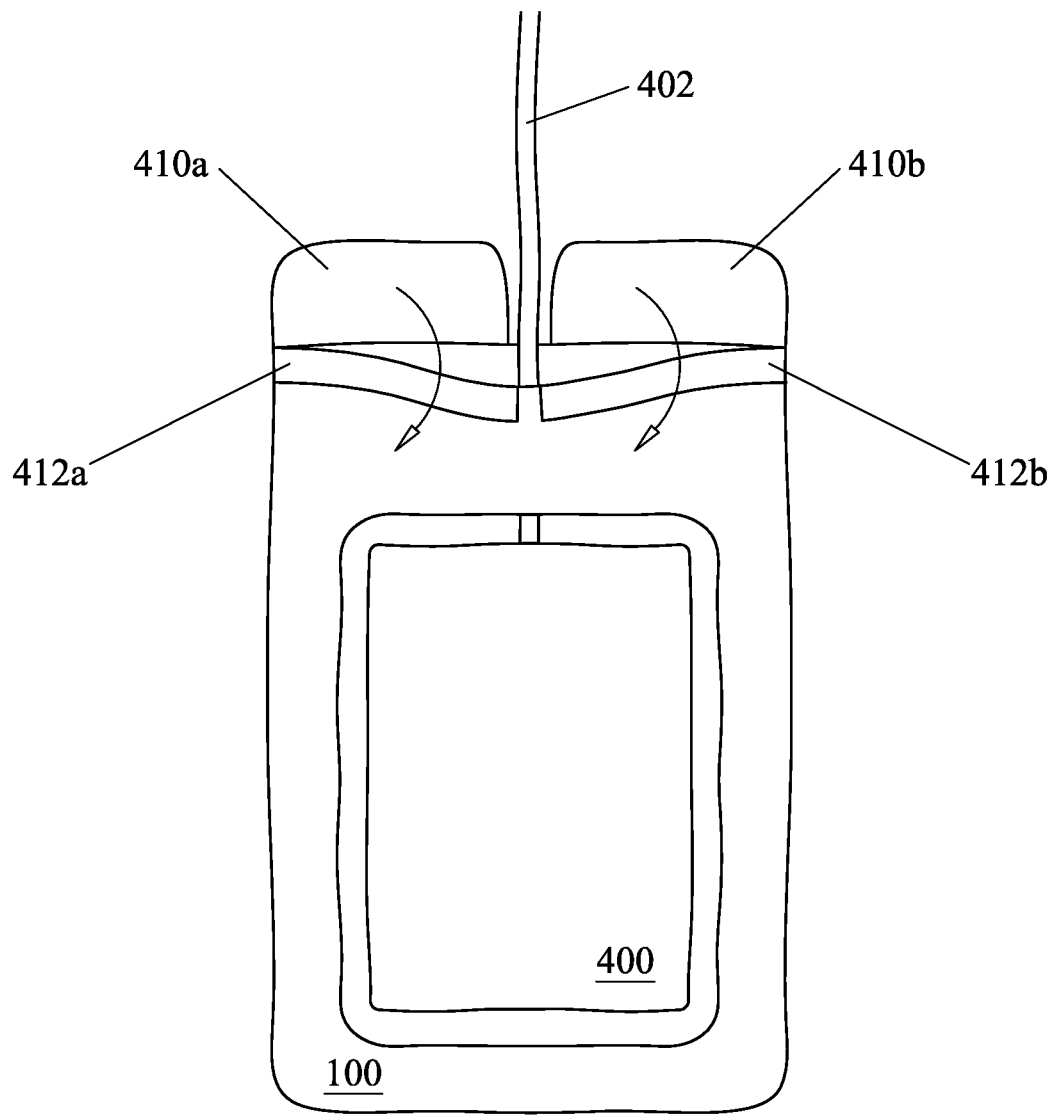
Figure 4H:
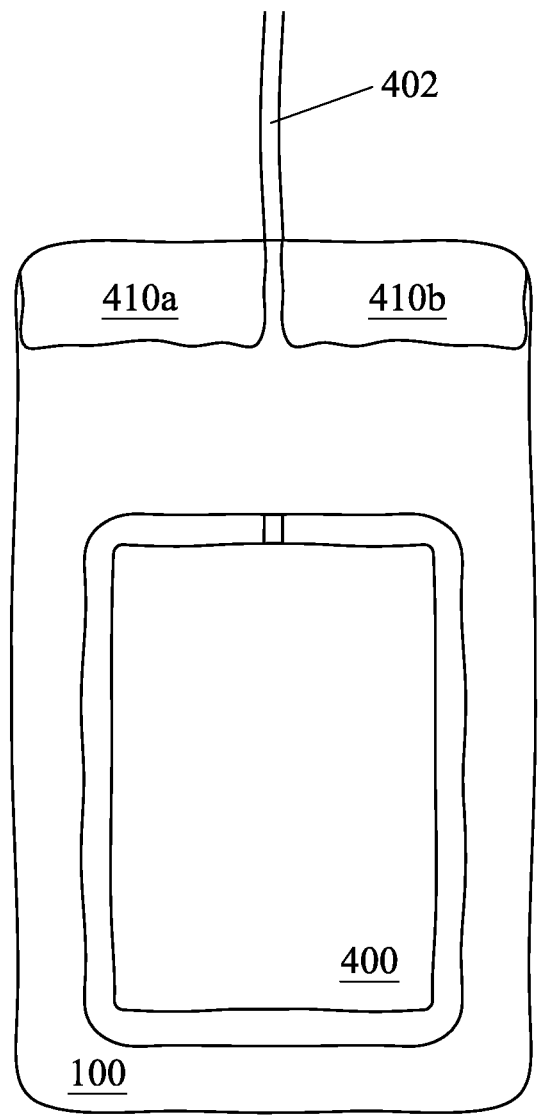

In one embodiment, sealing strips 412a/b may be sticky strips that are exposed by peeling away a protecting film (not depicted). Alternatively, sealing strips 412a/b may be composed of one-half of a Velcro™ fastener (i.e., either the velvet surface or the surface with tiny-hooks that affixes onto the velvet surface). In the case of a Velcro™ fastener, the other half of the Velcro™ fastener (not depicted) would be located on sealing flaps 410a/b. FIG. 4F depicts a back view of heating releasing enclosure 100 in which fold line 414 may be visible. When the sealing operation is performed, sealing flaps 410a/b may be folded with respect to fold line 414. FIG. 4G depicts heat releasing enclosure 100 with a fluid container 400 inserted therein. FIG. 4H depicts the heat releasing enclosure 100 after sealing flaps 410a/b have been folded downwards and pressed onto sealing strips 412a/b. As previously mentioned, gap 411 between sealing flaps 410a/b allows fluid dispensing conduit 402 to protrude out from cavity of 202 of heat releasing enclosure 100.

Figure 5A:
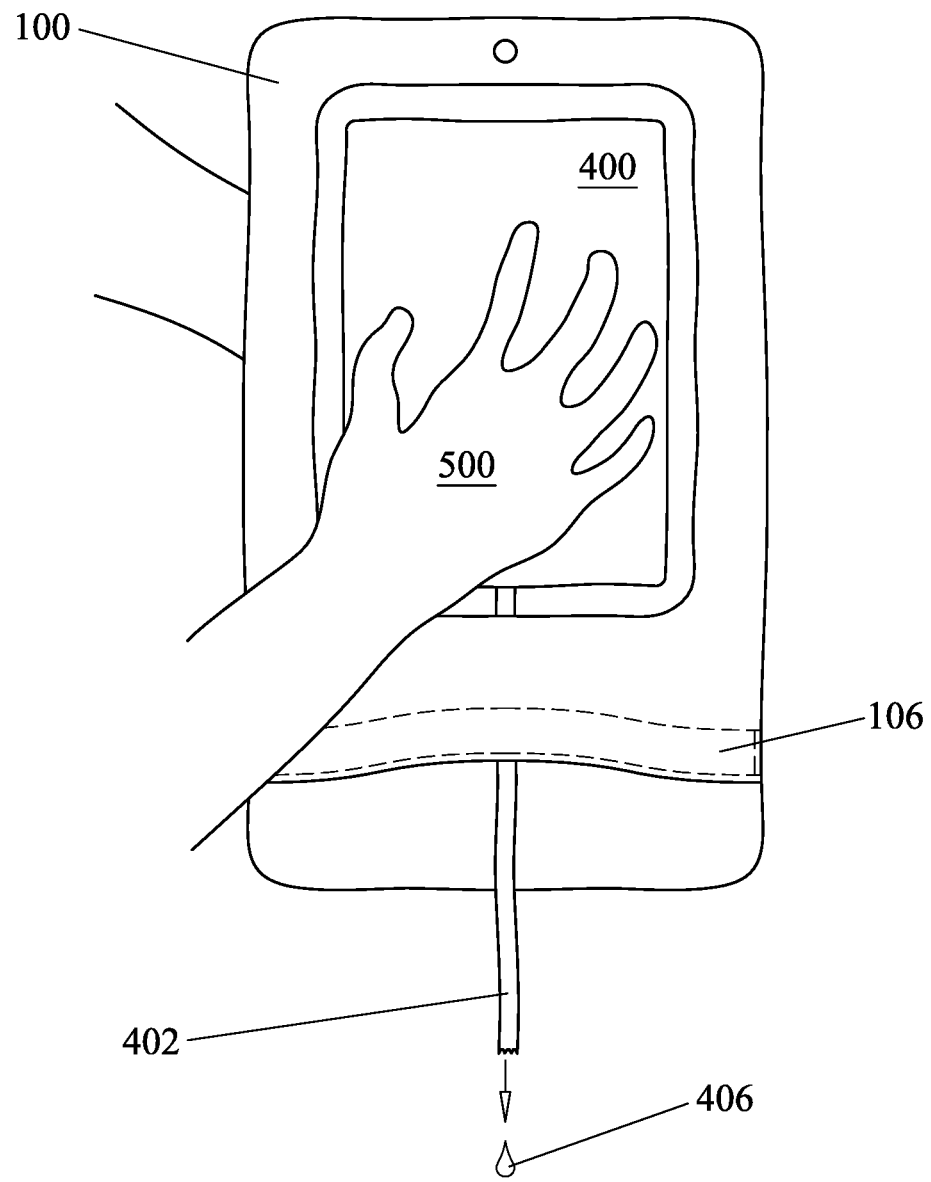
FIG. 5A depicts a first method of dispensing fluid from a heated fluid container, in which a person uses his/her hands to apply pressure to a heat releasing enclosure, in accordance with one embodiment of the invention.

FIG. 5A depicts a first method of dispensing fluid from heated fluid container 400, in which a person uses his/her hands 500 to apply pressure to heat releasing enclosure 100. The use of a person's hands to manually dispense the fluid from the heated fluid container may be less than optimal, but may be all that is available in certain circumstances (e.g., in a combat zone).

Figure 5B:
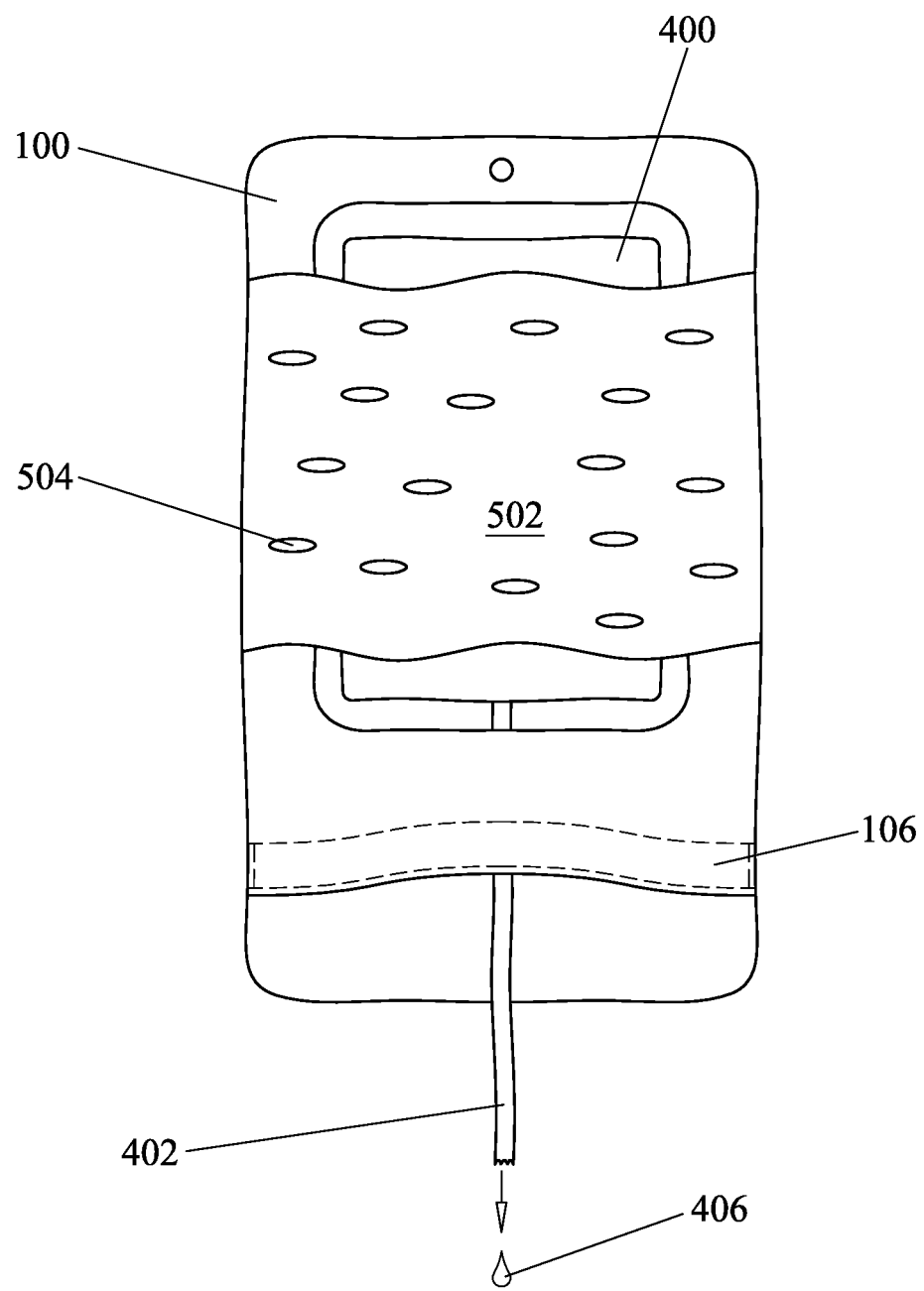
FIG. 5B depicts a second method of dispensing fluid from a heated fluid container, in which an elastic band, which tightly encircles the heat releasing enclosure, is used to apply pressure to a heat releasing enclosure, in accordance with one embodiment of the invention.

FIG. 5B depicts a second method of dispensing fluid from the heated fluid container 400, in which an integrated elastic band 502 (i.e., an elastic band that is integrated with heat releasing enclosure 100) is used to apply pressure to heat releasing enclosure 100. In one embodiment, elastic band 502 may be an Esmarch® bandage. In operation, oxygen impermeable sheet 116 is first peeled away, before elastic band 502 is tightly wound around heat releasing enclosure 100, causing pressure to be applied to heat releasing enclosure 100, and in turn, to heated fluid container 400. Perforations 504 may be present in elastic band 502 so as to allow air to penetrate through elastic band 502 and contact oxygen permeable membrane 120. The use of elastic band 502 may also be less than optimal as the pressure applied to fluid container 400 may decrease over time, which may cause the rate at which fluid is dispensed to decrease over time. However, the use of elastic band 502 may be preferable to manually squeezing fluid from heated fluid container 400 (as in FIG. 5A) in an environment where there is a shortage of medical professionals (e.g., in a combat zone). If there is only one medic available to treat a wounded soldier, the medic may use elastic band 502 to dispense a fluid (e.g., blood) from heated fluid container 400, which frees the medic's hands to perform other lifesaving tasks (e.g., intubation).

Figure 5C:
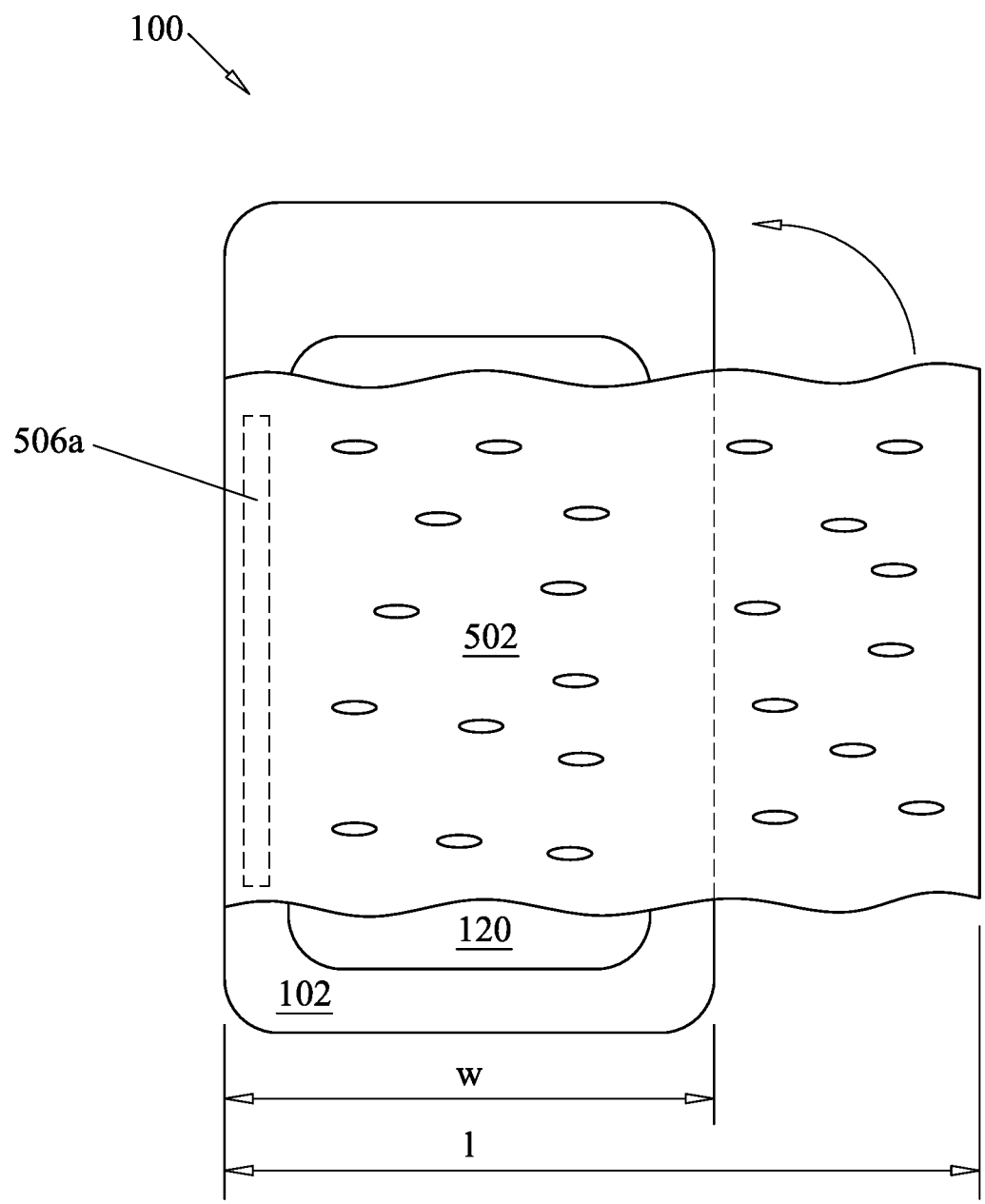
FIGS. 5C and 5D illustrate additional details regarding how the elastic band is attached to the heat releasing enclosure, in accordance with one embodiment of the invention.
Figure 5D:
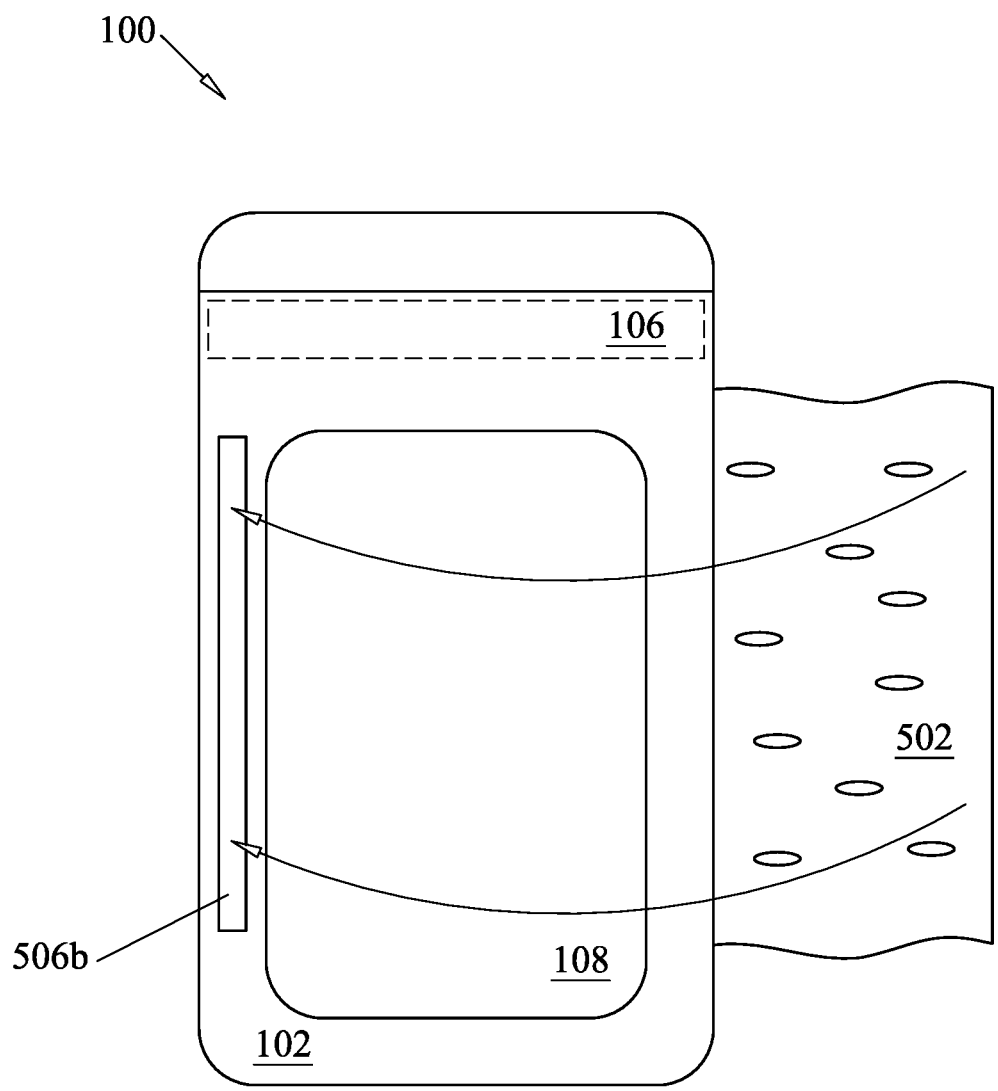

FIGS. 5C and 5D depict additional details regarding how elastic band 502 may be secured to insulated shell 102 of heat releasing enclosure 100. FIG. 5C depicts a back view of heat releasing enclosure 100 in which a first end of elastic band 502 may be permanently secured (e.g., by means of glue, sewing, etc.) or releasably secured (e.g., by a Velcro™ fastener) to first attaching area 506a on insulated shell 102. FIG. 5D depicts a front view of heat releasing enclosure 100 in which the second end of elastic band 502 may be releasably secured by a medic to second attaching area 506b on insulated shell 102. The attachment means associated with second attaching area 506b may be a Velcro™ fastener, hooks, buttons, etc. For simplicity of illustration, the "wrapping" of the elastic band is shown in FIGS. 5C and 5D without a fluid container in the heat releasing enclosure, but it is understood that in the typical operation, a fluid container will be disposed in the heat releasing enclosure prior to the wrapping of the elastic band. If not already apparent, the non-stretched length, l, of elastic band 502 may be less than twice the width, w, of heat releasing enclosure 100 so that securing the second end of elastic band 502 to second attachment area 506b requires elastic band 502 to be stretched, which in turn applies pressure to heated fluid container 400. In other words, elastic band 502 is wrapped around a periphery of insulated shell 102 in a taut manner.

It is noted that when a medic takes heat releasing enclosure 100 out of a sterile package, the first end of elastic band 502 may already be secured to first attaching area 506a. Such "pre-assembly" prevents elastic band 502 from being accidentally dropped and lost on the floor/ground, as might otherwise occur in the chaotic and high pressure environment of a combat zone. It is also noted that elastic band 502 is an optional feature, as it might not be needed in all use cases, such as the use case described in FIG. 5E below.

Figure 5E:
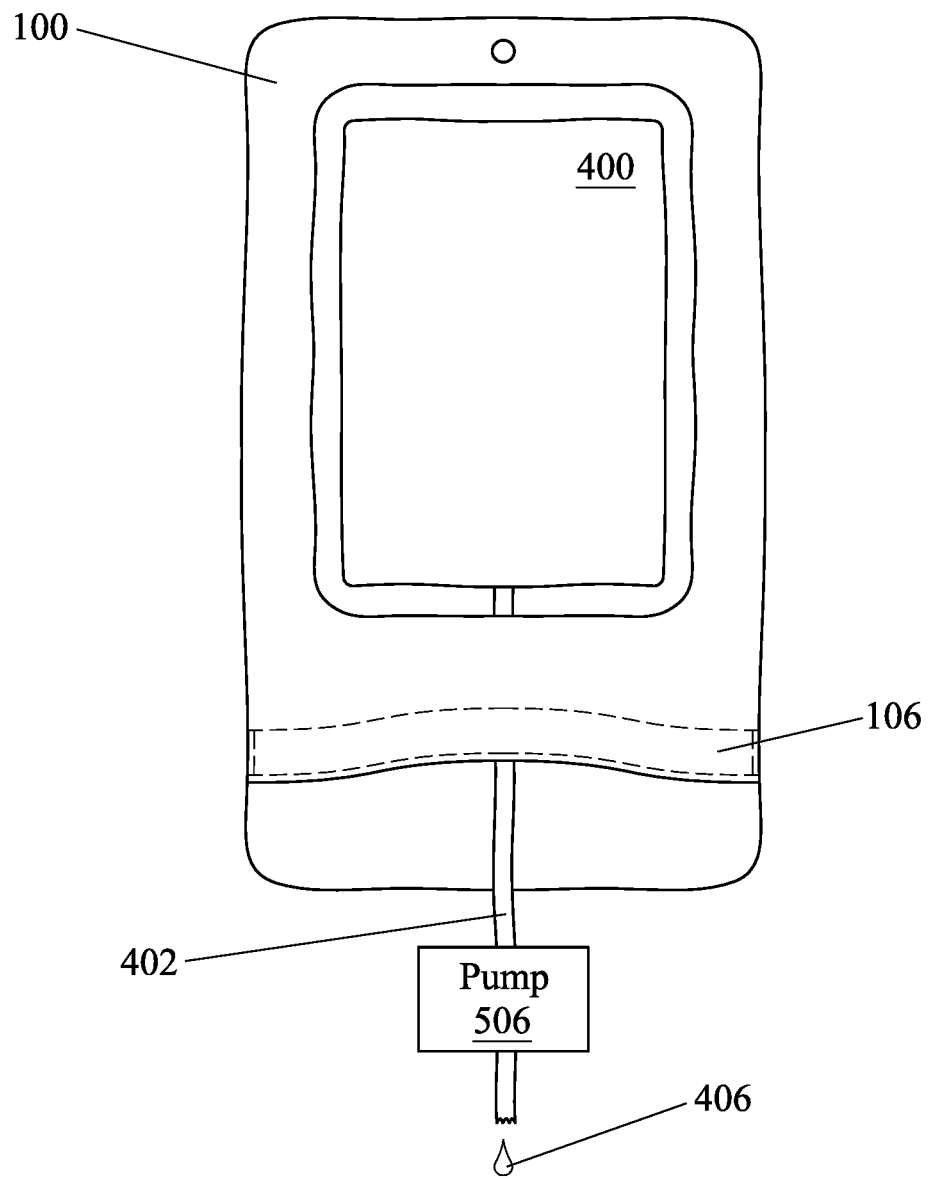
FIG. 5E depicts a third method of dispensing fluid from a heated fluid container, in which a pump is used to pump fluid from the heated fluid container, in accordance with one embodiment of the invention.

FIG. 5E depicts a third method of dispensing fluid from the heated fluid container 400, in which pump 506 is used to pump fluid from heated fluid container 400. Pump 506 may be battery powered (or powered by an electrical outlet) and may dispense fluid 406 from heated fluid container 400 at a constant rate. In some instances, pump 506 is also configured to heat fluid 406, so heat releasing enclosure 100 may serve to "pre-warm" the fluid from the original storage temperature to a mid-point temperature, before the heating mechanism of pump 506 is used to further warm the fluid from the mid-point temperature to the final desired temperature. The pre-warming of the fluid using heat releasing enclosure 100, thus, is able to shorten the amount of time taken to warm the fluid from the original storage temperature to the final desired temperature. The third method of dispensing fluid may be more common in a hospital setting where pump 506 and an electrical source to power pump 506 are readily available.

Figure 6A:
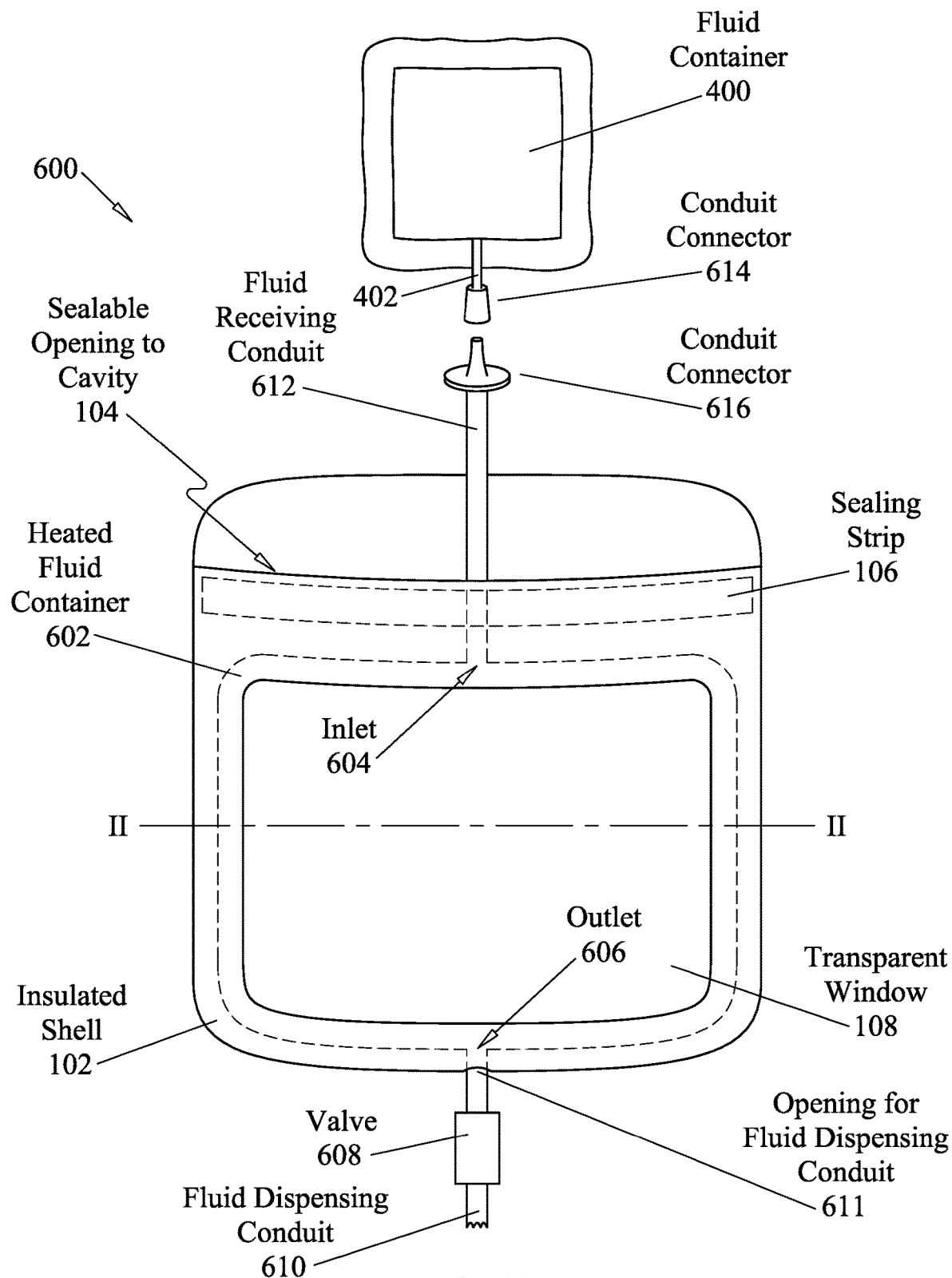
FIG. 6A depicts a front view of a fluid heating system configured to receive a fluid, warm the fluid and then dispense the warmed fluid, in accordance with one embodiment of the invention.

FIG. 6A depicts a front view of fluid heating system 600 that is configured to receive a fluid, warm the fluid, and dispense the warmed fluid. In contrast to the embodiments depicted in the figures so far, fluid is transferred from fluid container 400 (i.e., a blood bag from a blood bank) to fluid container 602 that is located within a heat releasing enclosure similar to heat releasing enclosure 100. Fluid container 602 may have dimensions larger than those of fluid container 400 so that the surface area of fluid container 602 is larger than that of fluid container 400. A larger surface area permits more contact area between heat releasing member 212 and the fluid container 602 (as compared to heat releasing member 212 and fluid container 400), which in turn increases the rate at which fluid can be warmed or heated.

The construction of the heat releasing enclosure of fluid heating system 600 may be substantially similar to that of heat releasing enclosure 100, except for an additional opening 611 to allow for the passage of fluid dispensing conduit 610. Fluid container 602 may include inlet 604 that is fluidly connected to fluid receiving conduit 612. Fluid may be transferred from fluid container 400 into fluid container 602 through fluid receiving conduit 612. Conduit connectors 614 and 616 may be used to couple fluid receiving conduit 612 of fluid container 602 to fluid dispensing conduit 402 of fluid container 400. Fluid container 602 may also include outlet 606 that is fluidly connected to fluid dispensing conduit 610. A valve 608 may be present in fluid dispensing conduit 610 to control the flow of fluid out of fluid container 602.

Figure 6B:
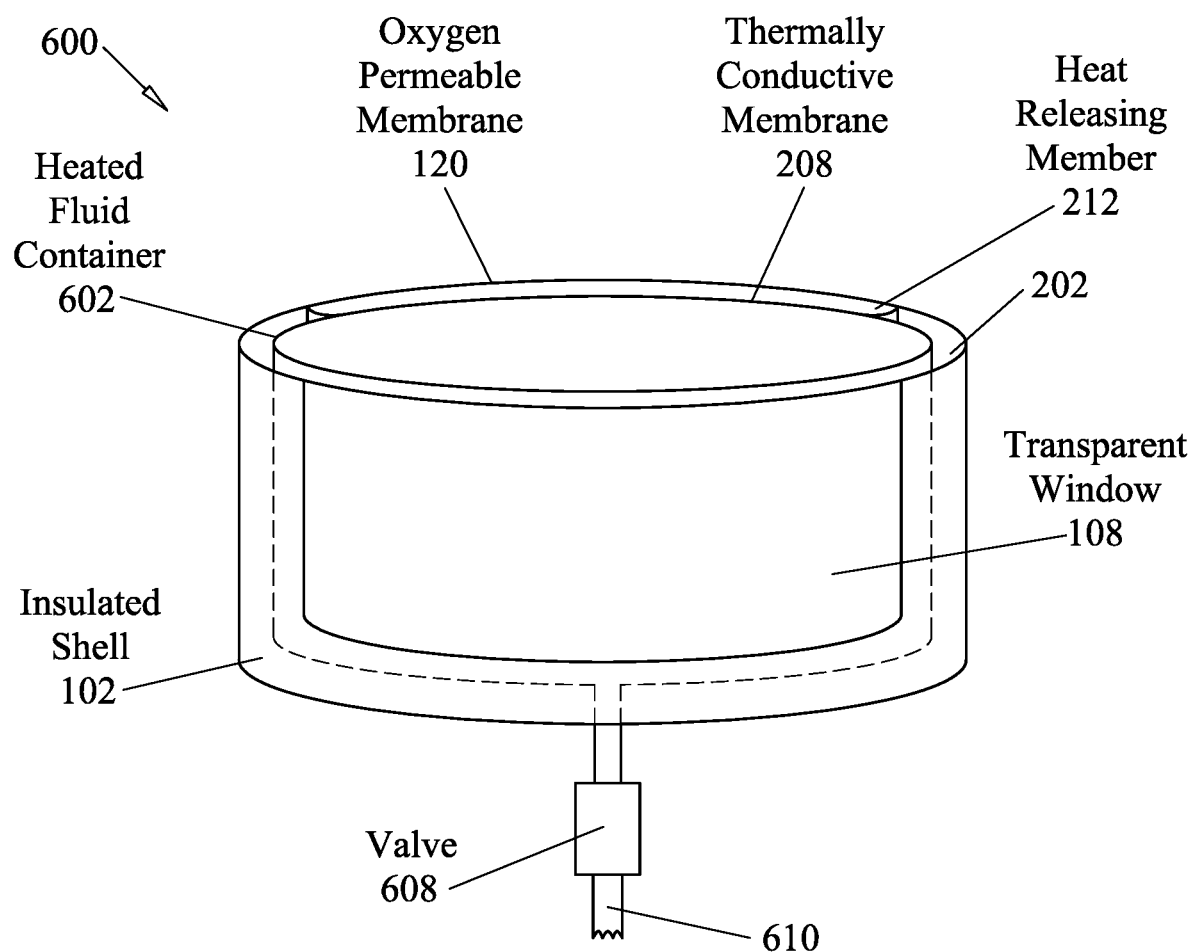
FIG. 6B depicts a perspective cross-sectional view of the fluid heating system along line II-II of FIG. 6A, in accordance with one embodiment of the invention.

FIG. 6B depicts a perspective cross-sectional view of fluid heating system 600 along line II-II of FIG. 6A. As shown, fluid container 602 may be disposed within cavity 202 of the heat releasing enclosure. One side of fluid container 602 may contact thermally conductive membrane 208 of heat releasing member 212 for increased heat transfer. As previously described, it is also possible for an insulating sheet (not depicted) to be disposed between thermally conductive membrane 208 and fluid container 602 so as to prevent heat releasing member 212 from overheating certain portions of the fluid within fluid container 602.

Figure 6C:
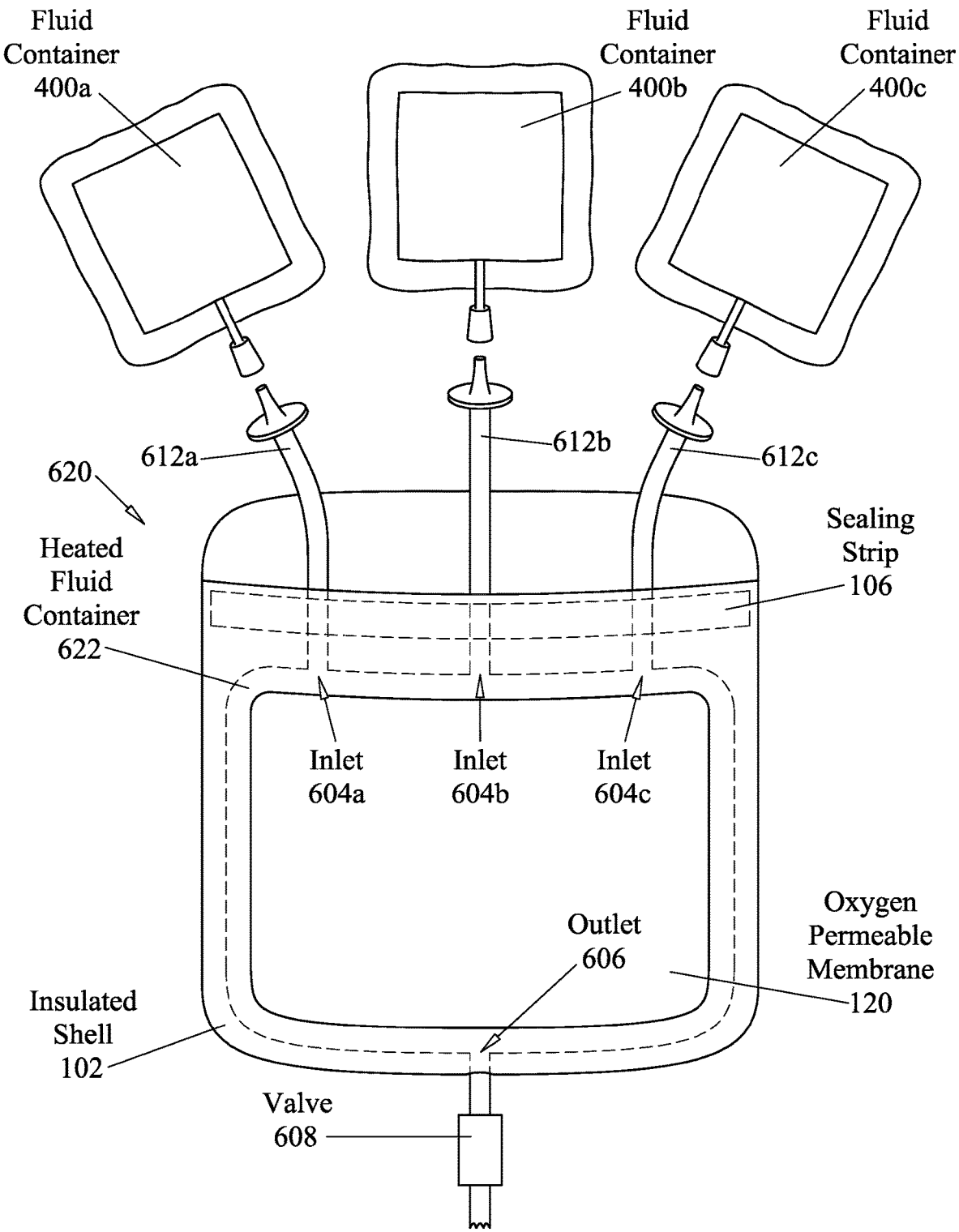
FIG. 6C depicts a front view of an alternative embodiment of the fluid heating system of FIG. 6A, in which the fluid heating system is configured to simultaneously receive fluid from a plurality of fluid containers, in accordance with one embodiment of the invention.

FIG. 6C depicts a front view of fluid heating system 620, which is a variant of fluid heating system 600 depicted in FIG. 6A. In fluid heating system 620, fluid container 622 contains a plurality of inlets 604a-604c, allowing fluid from multiple fluid containers 400a-400c to be simultaneously delivered into fluid container 622. While three inlets are depicted in FIG. 6C, it is understood that two or more inlets may be present in practice. Inlet 604a is fluidly connected to fluid receiving conduit 612a, which is configured to receive fluid from fluid container 400a. Inlet 604b is fluidly connected to fluid receiving conduit 612b, which is configured to receive fluid from fluid container 400b. Similarly, inlet 604c is fluidly connected to fluid receiving conduit 612c, which is configured to receive fluid from fluid container 400c. Fluid heating system 620 illustrates another advantage of using a larger fluid container 622 (i.e., larger than that of a 500 cc or 1000 cc fluid container from a blood bank), in that the fluid from several fluid containers 400a-400c can be warmed at the same time using a single heat releasing enclosure.

While the discussion so far has described the heat releasing enclosure for the primary purpose of heating a fluid, other uses are possible. For instance, heat releasing enclosure 100 may be used as a heat pack for preventing hypothermia and/or thawing an initial or more severe frost-bit injury. It is noted that care should always be taken to avoid direct contact of skin with heat releasing member 212, which could result in burns. Instead, skin should be covered with a barrier (e.g., clothes, gloves, socks, etc.) before placing the body part near heat releasing member 212. If a body part (e.g., hands, feet, fingers, toes, etc.) fits within cavity 202, the body part may be inserted within cavity 202. If a body part (e.g., groin, axilla) does not fit within cavity 202, the body part may be placed adjacent to oxygen permeable membrane 120. While not previously mentioned, heat is also released from heat releasing member 212 through oxygen permeable membrane 120, so a body part need not be placed within cavity 202 in order for that body part to be warmed.

Another use for heat releasing enclosure 100 is to warm small mission critical equipment (e.g., portable pulse oximeter, a portable end-tidal $CO_2$ monitor, digital thermometer, etc.) while operating in a cold environment (e.g., in the arctic, high mountains, etc.).

Thus, an oxygen-activated heat releasing enclosure has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An oxygen-activated heat releasing enclosure, comprising:
    an insulated shell comprising at least a first cutout portion, a second cutout portion, and a sealable opening that opens to a cavity of the oxygen-activated heat releasing enclosure;
    a transparent window disposed within the first cutout portion, the transparent window allowing contents within the cavity to be visible from outside of the cavity;
    a heat releasing member disposed within the second cutout portion, the heat releasing member comprising a powder chamber containing an oxygen-activated heat releasing powder, the powder chamber formed by (i) an oxygen permeable membrane that allows oxygen to pass through the oxygen permeable membrane into the powder chamber and (ii) a thermally conductive membrane disposed between the oxygen permeable membrane and the transparent window; and a sealing strip for sealing the sealable opening.

2. The oxygen-activated heat releasing enclosure of claim 1, wherein the insulated shell includes a hole for receiving a hanging mechanism.

3. The oxygen-activated heat releasing enclosure of claim 1, wherein the cavity is configured to receive a container of fluid.

4. The oxygen-activated heat releasing enclosure of claim 3, further comprising an elastic band that is integrated with the oxygen-activated heat releasing enclosure, wherein the elastic band, when wrapped around the insulated shell, is configured to dispense a fluid contained in the container of fluid.

5. The oxygen-activated heat releasing enclosure of claim 3, further comprising a temperature indicator, configured to indicate an approximate temperature of a fluid contained within the container of fluid.

6. The oxygen-activated heat releasing enclosure of claim 3, further comprising a temperature alarm configured to transmit an alarm when an approximate temperature of a fluid contained within the container of fluid exceeds a threshold.

7. The oxygen-activated heat releasing enclosure of claim 1, further comprising an oxygen impermeable sheet that is attached to the oxygen permeable membrane prior to activation of the oxygen-activated heat releasing enclosure.

8. The oxygen-activated heat releasing enclosure of claim 7, further comprising:
a battery;
an electrically powered heating element; and
a pull tab attached to the oxygen impermeable sheet and a non-conductive sheet separating the electrically powered heating element from a terminal of the battery, such that pulling of the pull tab simultaneously peels the oxygen impermeable sheet and electrically couples the electrically powered heating element with the battery.

9. The oxygen-activated heat releasing enclosure of claim 1, further comprising an electrically powered heating element.

10. A fluid heating system, comprising:
a heat releasing enclosure, comprising:
an insulated shell comprising at least a first cutout portion, a second cutout portion, and a first and second opening that lead to a cavity of the heat releasing enclosure;
a transparent window disposed within the first cutout portion; and
a heat releasing member disposed within the second cutout portion, wherein the heat releasing member comprises a powder chamber containing an oxygen-activated heat releasing powder, the powder chamber formed by (i) an oxygen permeable membrane that allows oxygen to pass through the oxygen permeable membrane into the powder chamber and (ii) a thermally conductive membrane; and
a first fluid receiving conduit that passes through the first opening;
a fluid dispensing conduit that passes through the second opening; and
a fluid container disposed within the cavity of the heat releasing enclosure, the fluid container comprising a first inlet that is fluidly connected to the first fluid receiving conduit and an outlet that is fluidly connected to the fluid dispensing conduit.

11. The fluid heating system of claim 10, further comprising:
a second fluid receiving conduit that passes through the first opening,
wherein the fluid container further comprises a second inlet that is fluidly connected to the second fluid receiving conduit.

* * * * *